United States Patent [19]

Mihara

[11] Patent Number: 4,701,034

[45] Date of Patent: Oct. 20, 1987

[54] LARGE APERTURE ZOOM LENS SYSTEM

[75] Inventor: Shin-ichi Mihara, Tokyo, Japan

[73] Assignee: Olympus Optical Co., Ltd., Tokyo, Japan

[21] Appl. No.: 706,863

[22] Filed: Feb. 28, 1985

[30] Foreign Application Priority Data

Mar. 2, 1984 [JP] Japan .................................. 59-38649
Mar. 2, 1984 [JP] Japan .................................. 59-38650
Mar. 7, 1984 [JP] Japan .................................. 59-41974

[51] Int. Cl.$^4$ ...................... G02B 9/64; G02B 15/14
[52] U.S. Cl. ................................................ 350/427
[58] Field of Search .................................... 350/427

[56] References Cited

U.S. PATENT DOCUMENTS 3,659,921  5/1972  Hirose et al. .
4,525,036  6/1985  Fujibayashi et al. ................ 350/427

FOREIGN PATENT DOCUMENTS 2349312   4/1974  Fed. Rep. of Germany .
48-32387  10/1973 Japan .
55-40852  10/1980 Japan .
57-78513   5/1982 Japan .
214119   12/1983 Japan .

Primary Examiner—John K. Corbin
Assistant Examiner—Rebecca D. Gass
Attorney, Agent, or Firm—Cushman, Darby & Cushman

[57] ABSTRACT

A large-aperture zoom lens system comprising a first focusing lens unit having a positive focal length, a second variator lens unit having a negative focal length, a third compensator lens unit having a negative focal length and a fourth relay lens unit, said fourth lens unit consisting of a front subunit comprising at least one negative lens component and a rear subunit comprising at least two positive lens components. Said lens system comprises a small number of lens elements, and has a short total length, a long back focal distance and favorably corrected aberrations.

19 Claims, 53 Drawing Figures

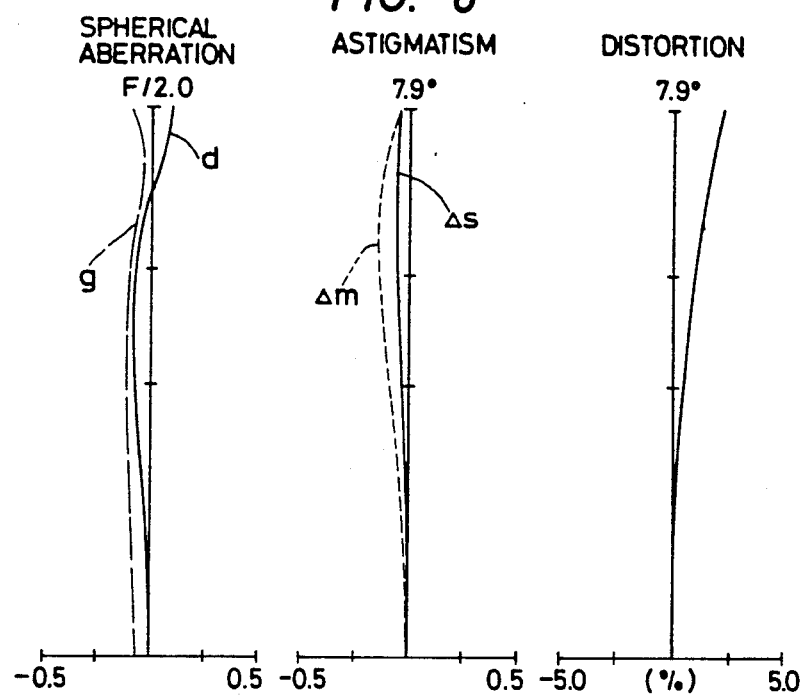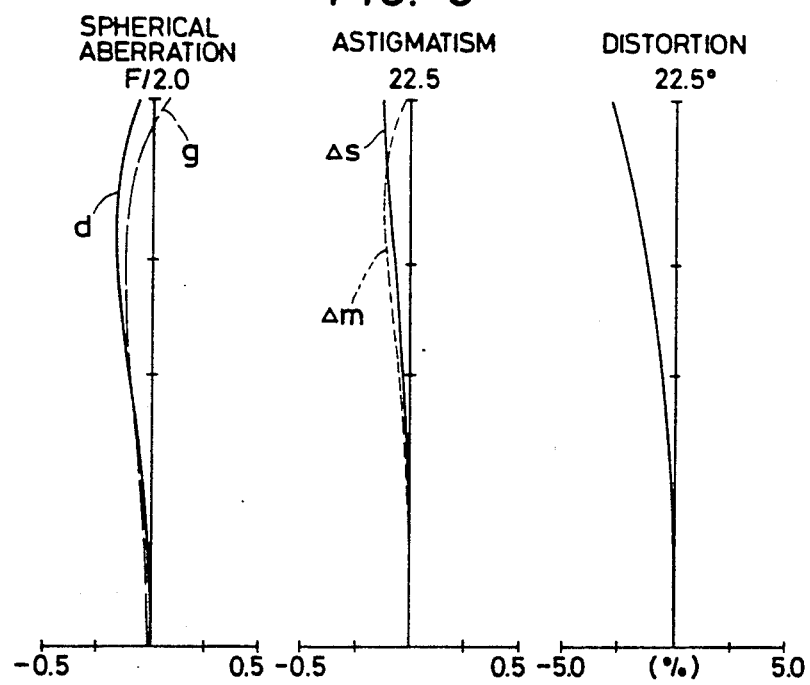

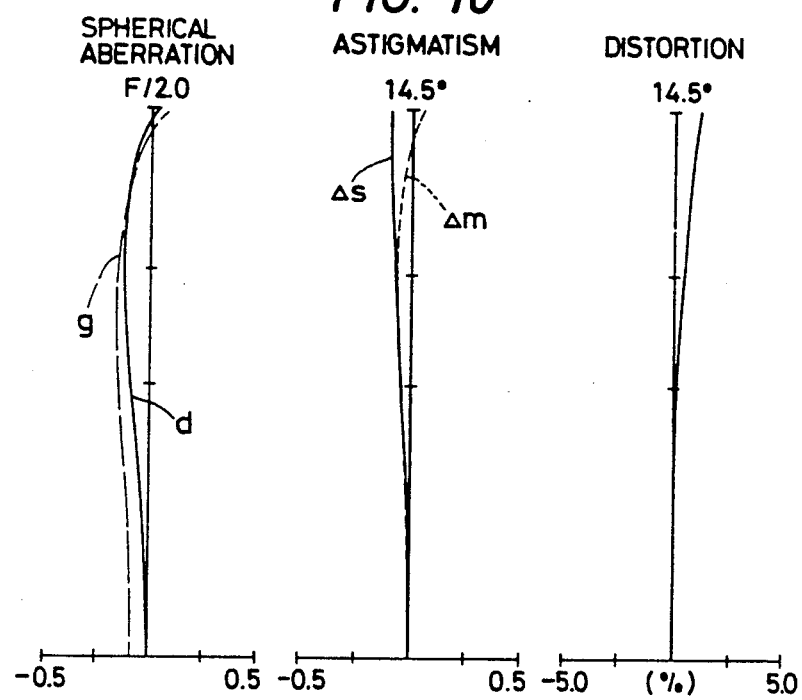
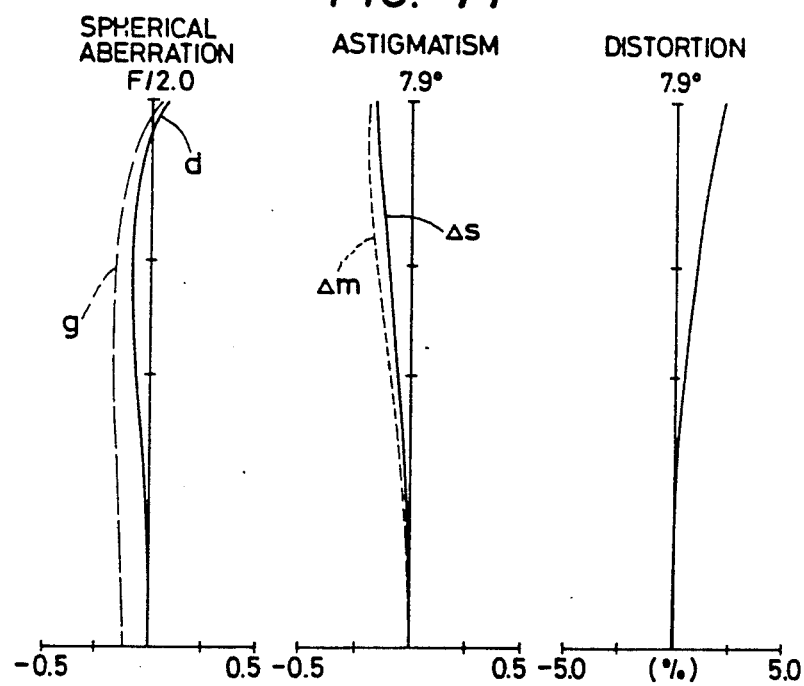

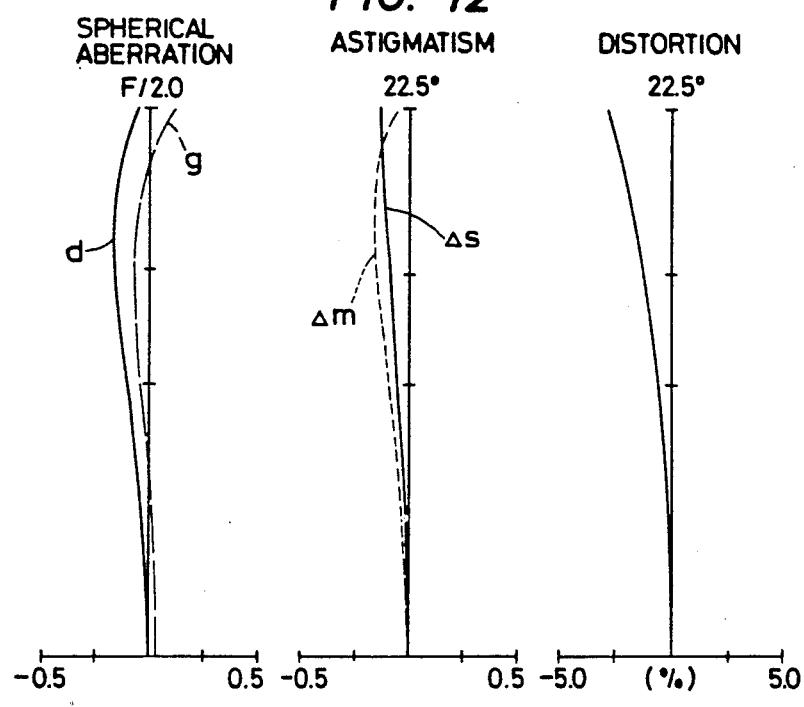
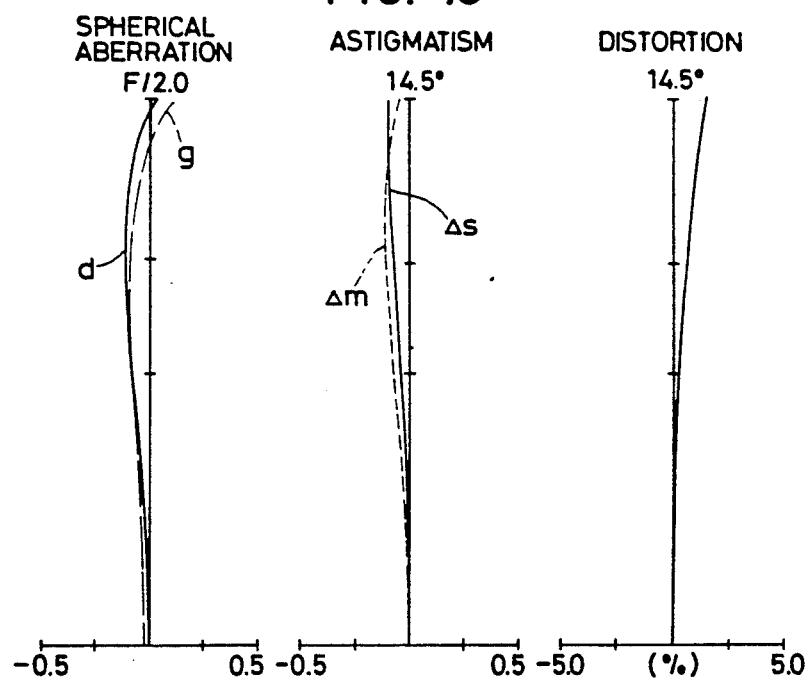

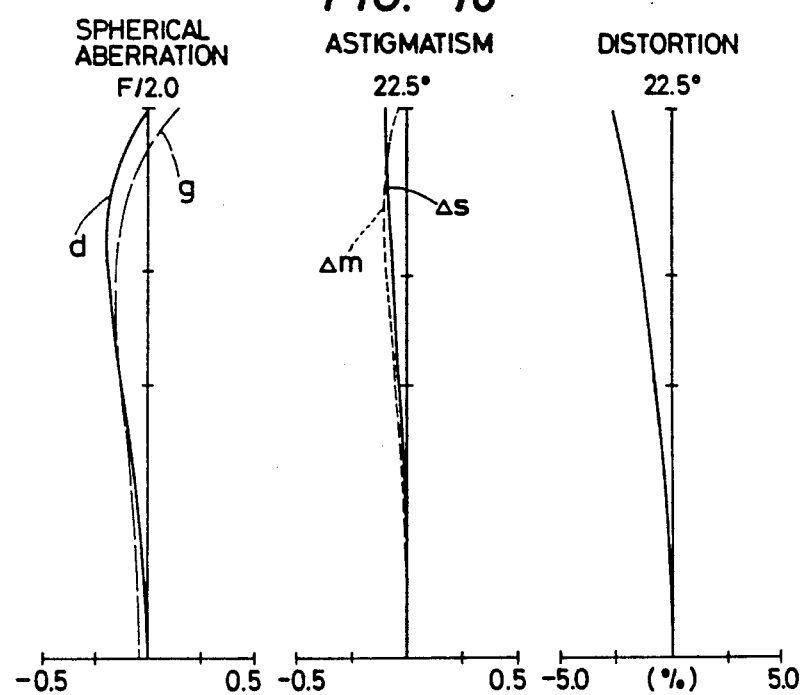
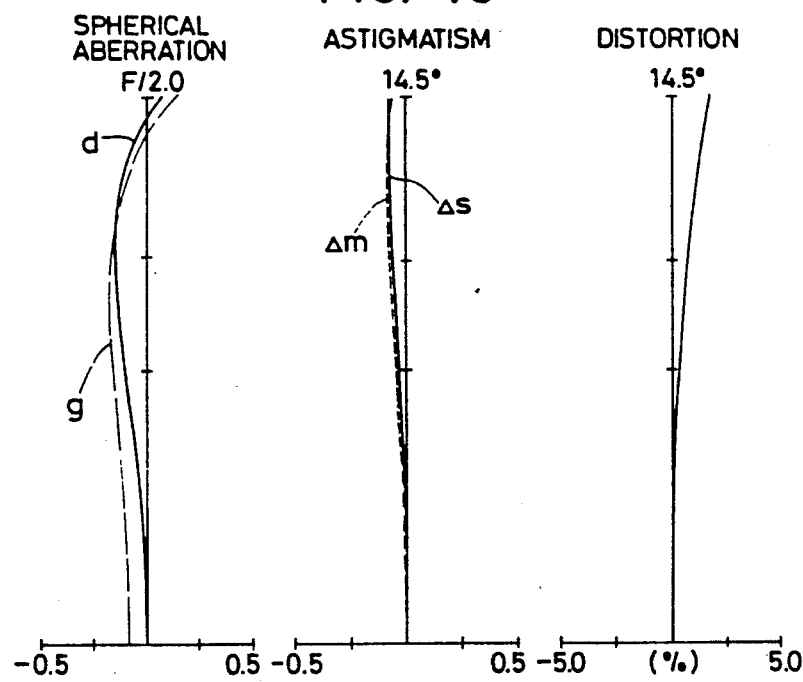

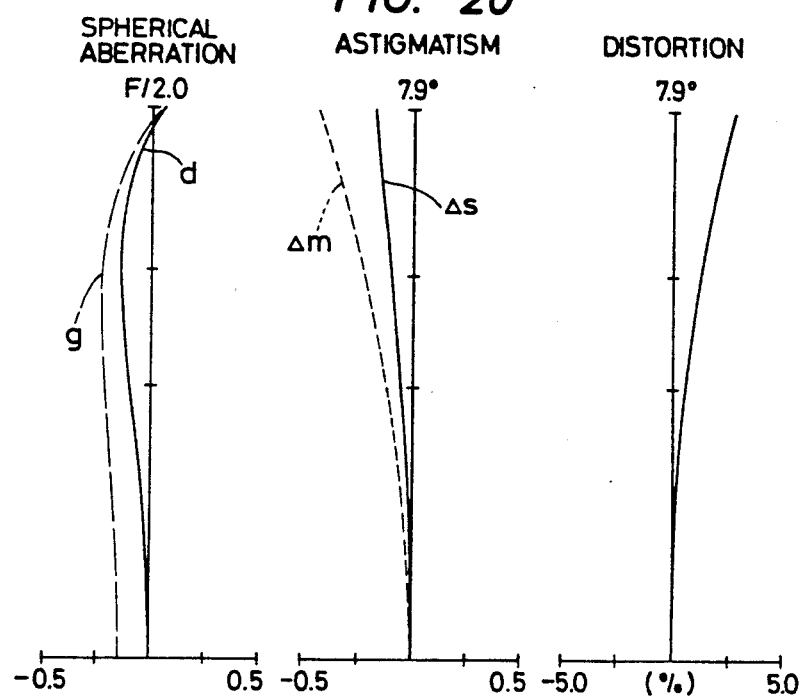
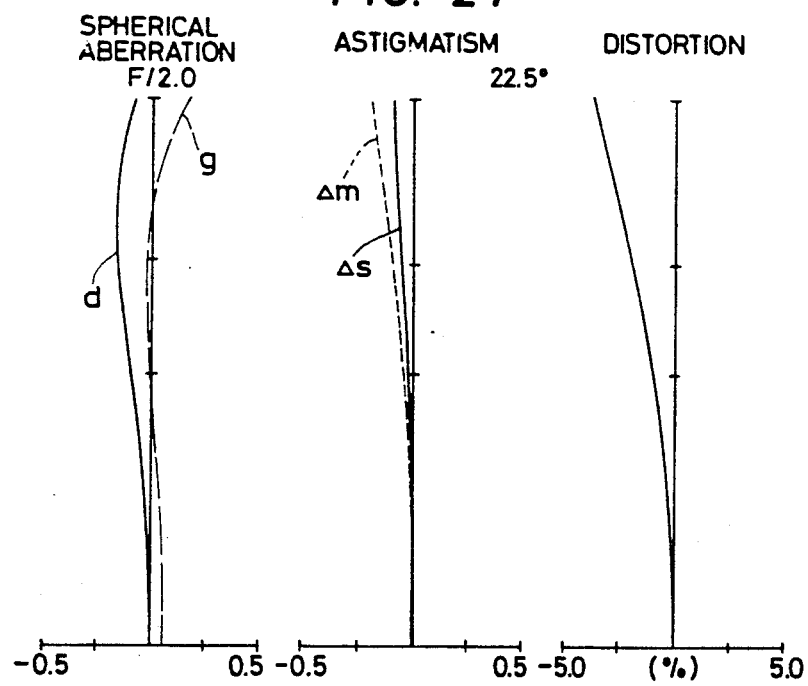

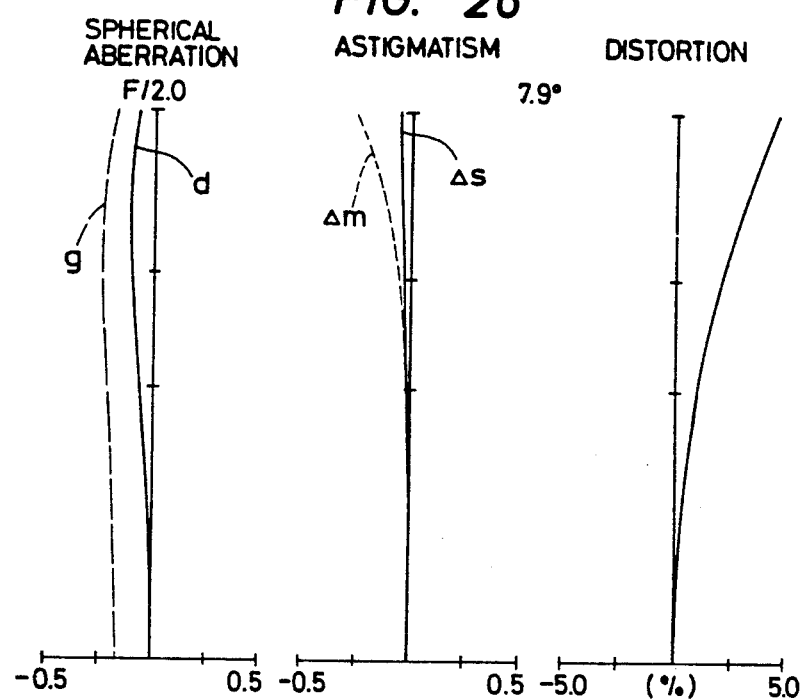
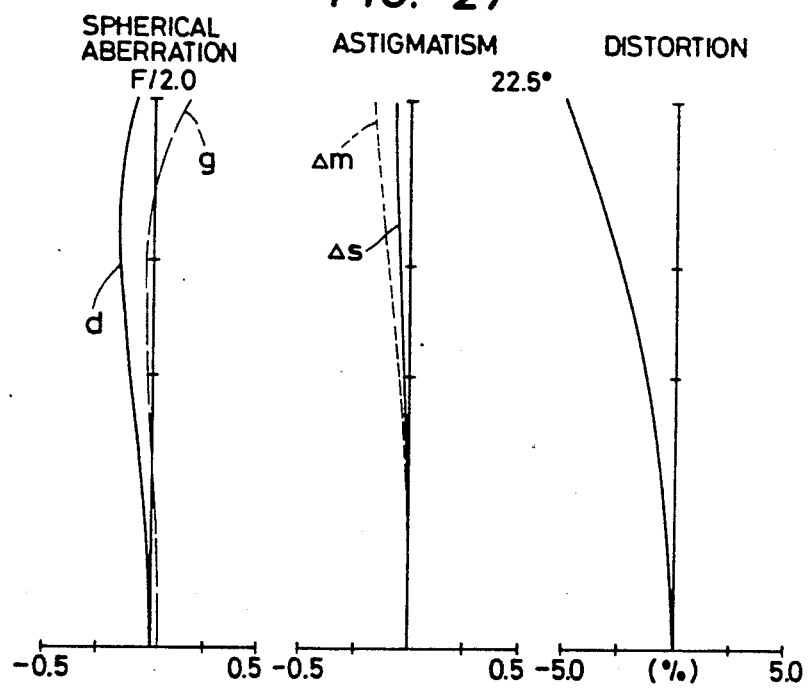

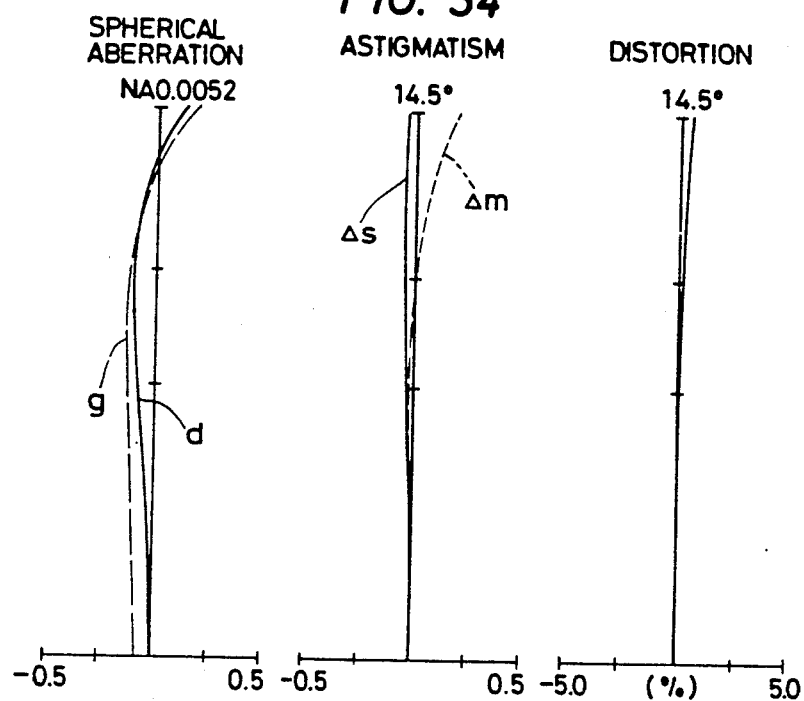
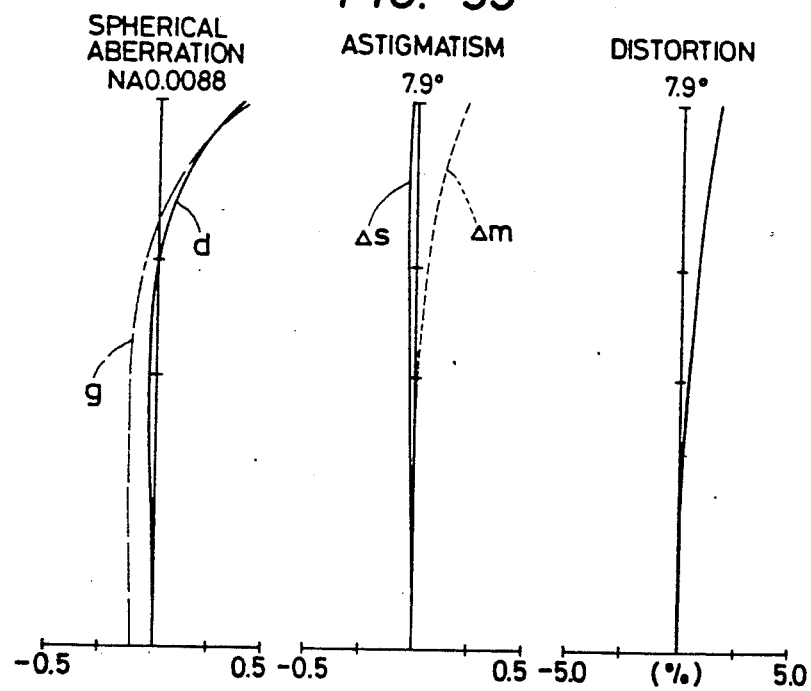

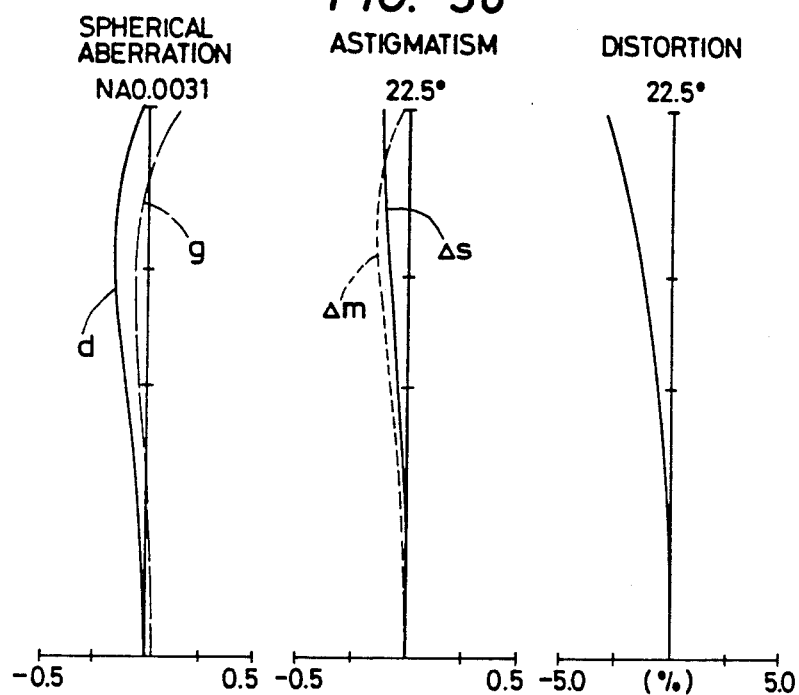
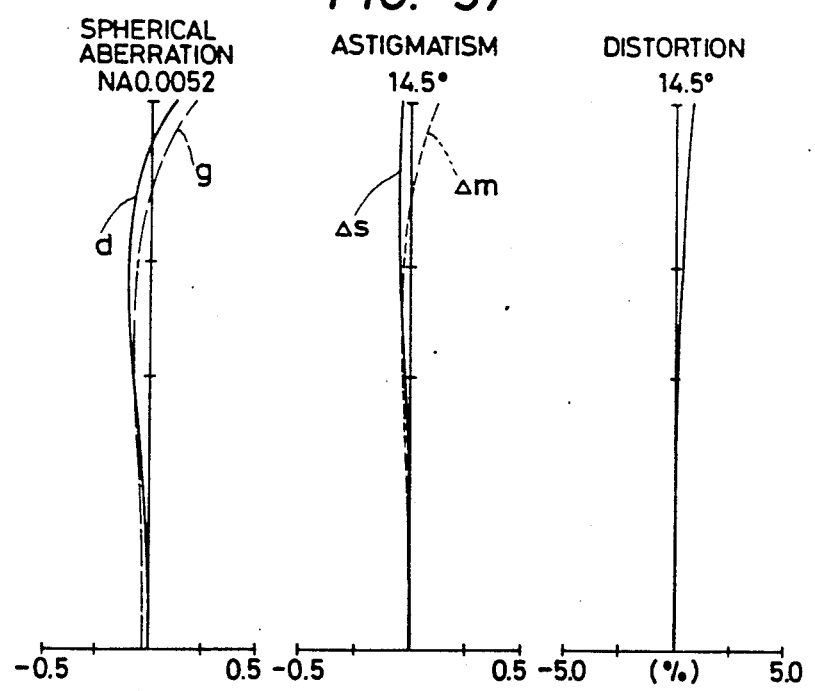

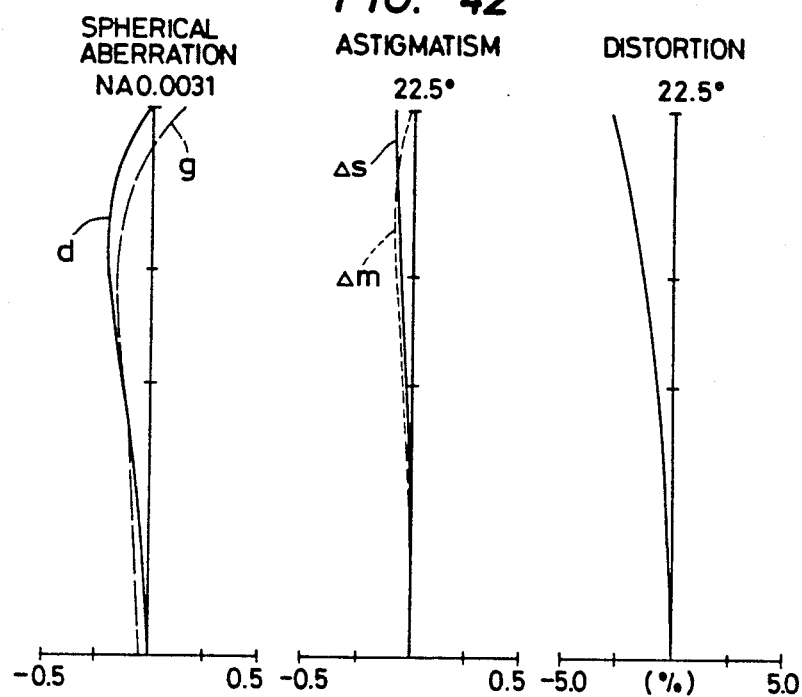
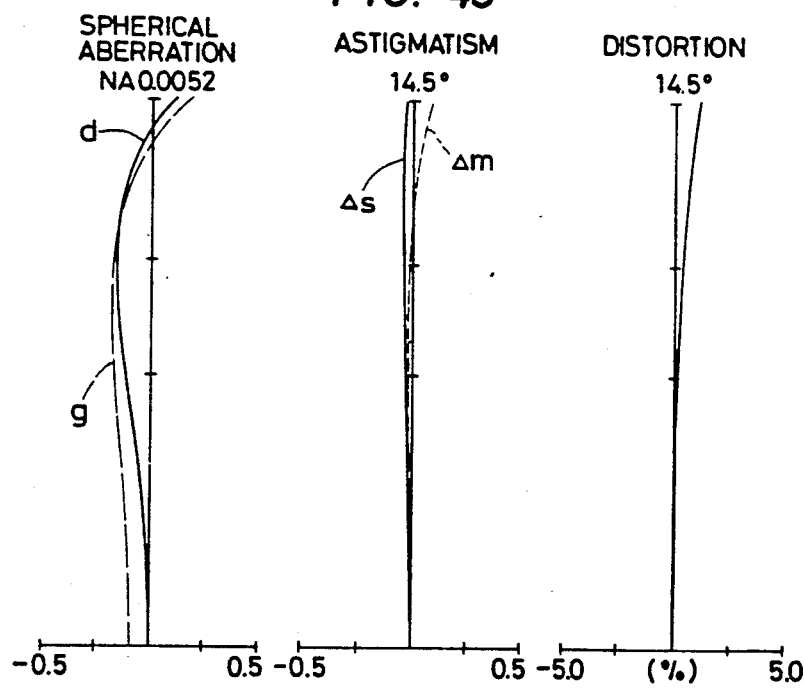

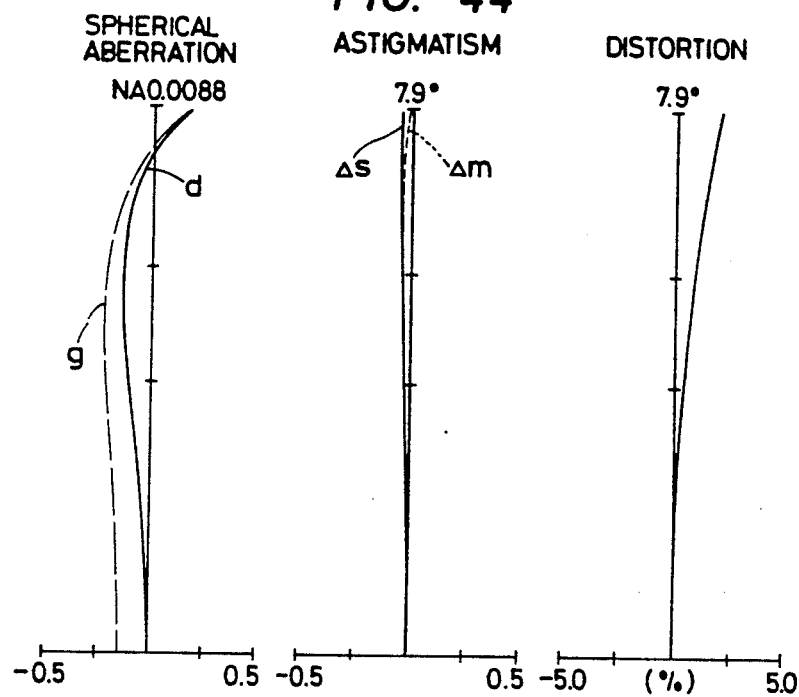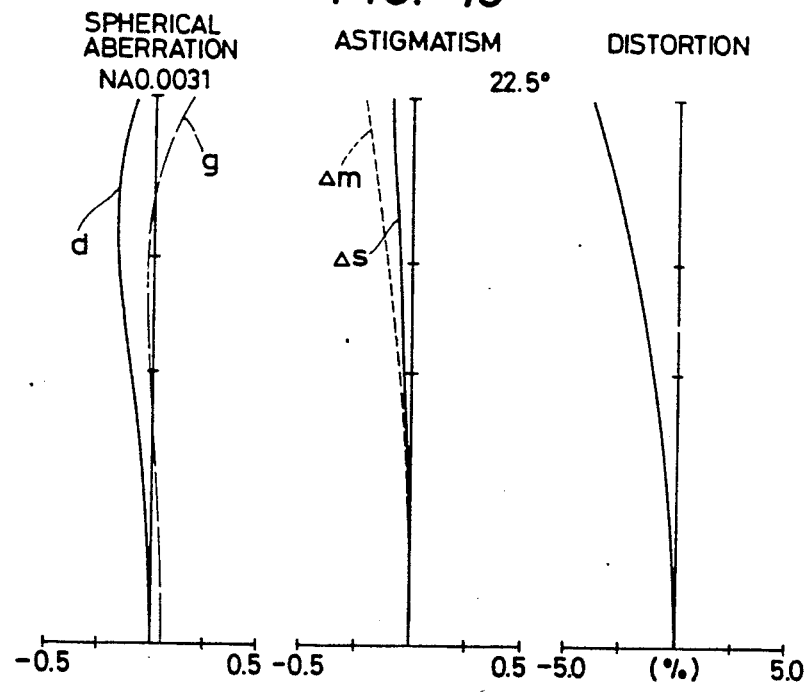

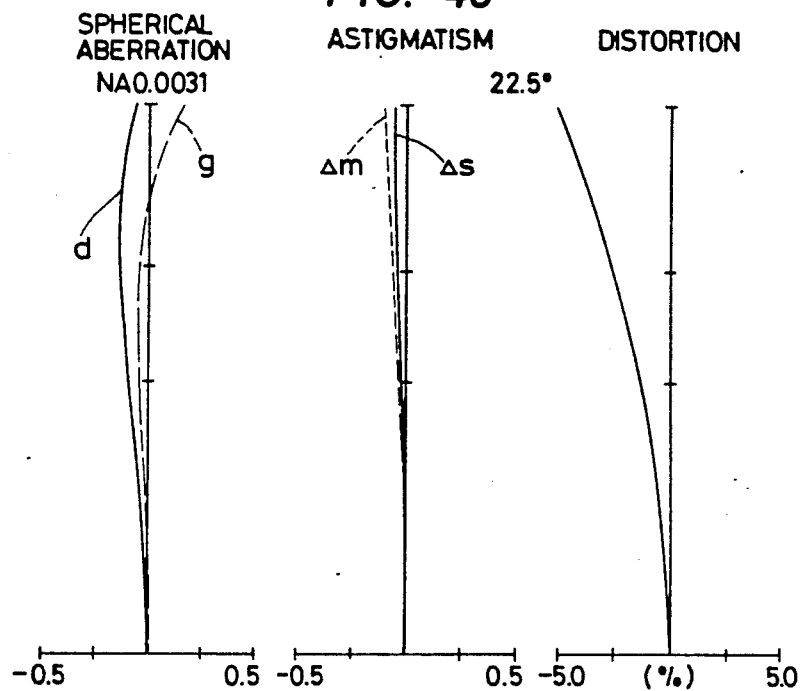
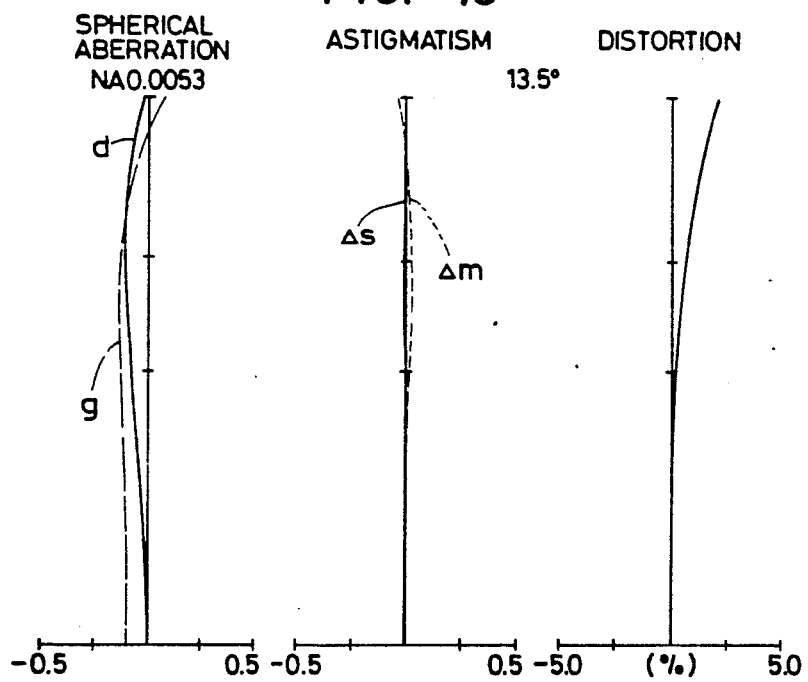

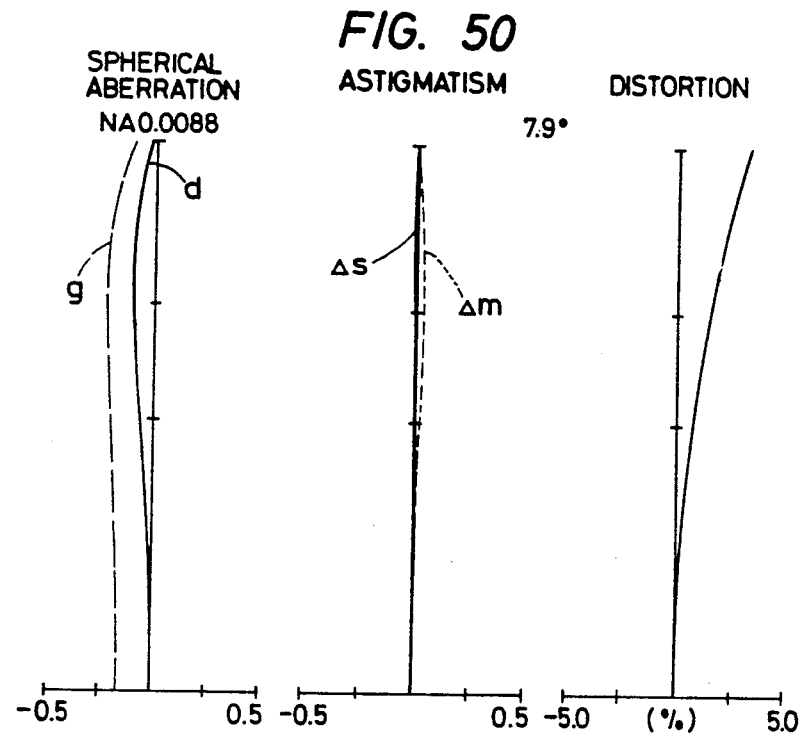
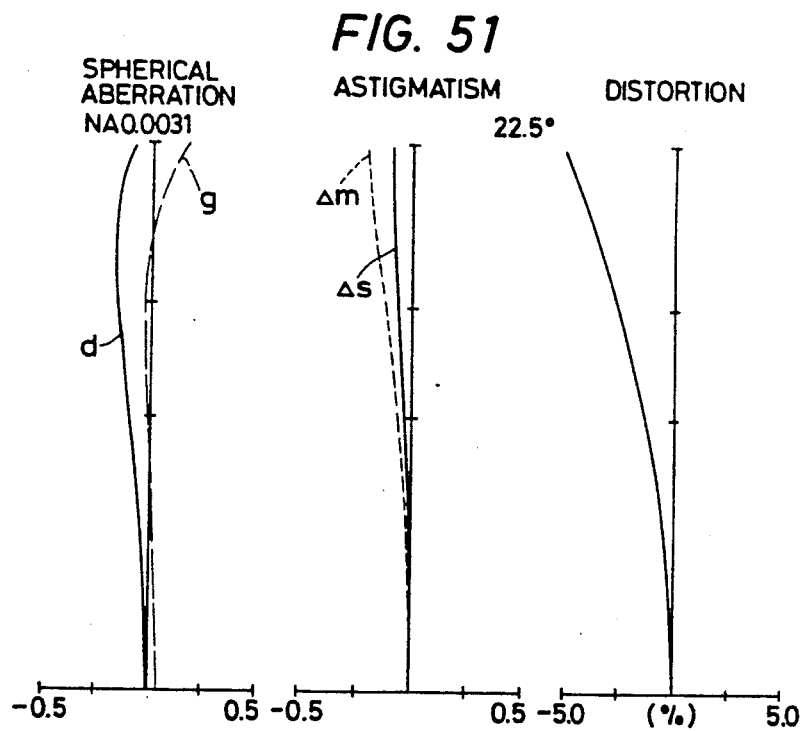

LARGE APERTURE ZOOM LENS SYSTEM

BACKGROUND OF THE INVENTION (a) Field of the Invention

The present invention relates to a photographing zoom lens system, and more specifically to a compact large-aperture zoom lens system suited for use with electronic photographing cameras, television cameras or the like.

(b) Description of the Prior Art

Zoom lens systems have hitherto been adopted as lens systems for almost all the electronic photographing cameras, television cameras or the like. So much considerations have not been taken for compactness and manufacturing cost of these zoom lens systems though they are more excellent than the lens systems for use with cameras using Leica size of film in that the former lens systems have aperture ratios higher than F/2.0 and varifocal ratios higher than 3. However, in the recent circumstance where popular photographing cameras adopt the electronic pick-up devices, compactness and reduction of manufacturing cost are required for optical systems for use with said popular photographing cameras. Therefore, demands are increasing for zoom lens systems comprising a front lens component with a small diameter, having a short total length and using a small number of lens elements.

Since the lens systems of this type have a characteristic as one of component parts consisting a photographing systems and the weight of such lens system is restricted for the purpose of performing automatic focusing and power zooming at low power consumption, it is desirable to adopt a rear focusing system in place of the focusing system by shifting the first lens group, reduce number of lens groups to be shifted for zooming and use a relay lens system prolonging the back focal distance.

There are many photographing zoom lens systems which have aperture ratios higher than F/2.0 and varifocal ratios higher than 3. However, there has conventionally been known no zoom lens system that can satisfy the three requirements of compactness (short total length and small diameter of the front lens component), low manufacturing cost (especially, a small number of lens elements) and a long back focal distance, and has performance high enough to cope with the future possible increase in number of picture elements on the image pick-up device. Especially, there has been obtained no high performance lens system that is designed for a back focal distance having a value exceeding 0.9 times of geometrical mean $f_S$ of the shortest focal length $f_W$ and the longest focal length $f_T$ of said lens system. Lens systems having a long back focal distance are required since it is necessary to interpose various optical members between the final lens surface of the system and photographing surface. Therefore, ratio between back focal distance $f_B$ and $f_S$ must be increased as focal length of the lens system becomes shorter. Japanese published examined patent applications No. 40852/80, No. 32387/73, etc. disclosed zoom lens systems comprising small numbers of lens elements and having short back focal distances, but took no considerations to prolong the back focal distance.

The conventional zoom lens system performed focusing by shifting the front lens groups having the large diameters and heavy weights. However, the focusing system of this type had a defect to allow remarkable variations of aberrations, especially spherical aberration and chromatic aberration, especially when the lens systems are focused on objects located at short distances on the long focal length sides of the lens systems. Further, the focusing system of this type has another defect that diameter of the front lens component must be increased since the lower rays are eclipsed by the front lens component when the lens system is focused on an object located at a short distance. In order to eliminate these defects, it is preferable to adopt the rear focusing system. Automatic focusing is made possible at low power consumption by adopting the rear focusing system. As a zoom lens system using the rear focusing system, there has been known the one disclosed by Japanese published unexamined patent application No. 78513/82.

In the lens system disclosed as Embodiment 1, however, aberrations, especially astigmatism, are remarkably varied when said lens system is focused on an object located at a short distance. The lens system disclosed as Embodiment 2 has a small aperture ratio of F/5.6. Therefore, this conventional example does not satisfy the above-mentioned requirements of an aperture ratio larger than F/2.0 and a back focal distance longer than $0.9f_S$. In addition, performance of the said lens system is not so high since it allows remarkable variations of aberrations, especially spherical aberration and coma, when it is focused on an object located at a short distance.

SUMMARY OF THE INVENTION

A primary object of the present invention is to provide a large-aperture zoom lens system having a field angle of 15° to 45°, varifocal ratio of 3, an F number on the order of F/2.0, high performance, a short total length and a long back focal distance.

Another object of the present invention is to provide a large-aperture zoom lens system allowing little variations of aberrations, requiring no large a diameter for the front lens component owing to no insufficient light intensity caused by eclipse of the lower rays, being compatible with a simple focusing mechanism and having a rear focusing mechanism desirable for automatic focusing.

The zoom lens system according to the present invention comprises a varifocal subsystem consisting of a first lens unit I having a positive focal length and being immovable for varying focal length of said lens system, a second variator lens unit II having a negative focal length and being movable for varying focal length of said lens system, and a third compensator lens unit III having a negative focal length and being movable for compensating variation of image position mainly caused by varying focal length of said lens system, and a fourth relay lens unit. Said fourth lens unit is composed of a front subunit comprising at least one negative lens component and at least two positive lens components, and a rear subunit comprising at least two positive lens components.

The present invention has succeeded in reducing manufacturing cost and weight of the zoom lens system by designing the fourth relay lens unit in such a manner that it comprises a small number of lens components, i.e., 6 or 7 lens components. Further, the lens system according to the present invention has a long back focal distance so as to permit interposing various optical members between the final surface of the lens system and image surface. Moreover, the lens system according to the present invention is capable of favorably correcting aberrations such as spherical aberration and coma though it comprises a small number of lens components and has a long back focal distance. Speaking concretely, back focal distance has been prolonged by arranging negative lens component on the image side in the front subunit of the fourth lens unit so as to diverge rays with said negative lens component. In order to favorably to correct aberrations in the lens system comprising the small number of lens components and having the long back focal distance, a positive lens component having a surface with a small radius of curvature on the image side is arranged before said negative lens component. The reason for this arrangement is that, if a positive lens component having strongly positive refractive power on the image side is arranged before said negative lens component, the surface having strongly positive refractive power is arranged closely to the surface having strongly negative refractive power, and rays are subjected to a conflicting refracting action within a short distance, thereby making it difficult to correct spherical aberration.

The zoom lens system according to the present invention has the back focal distance prolonged by arranging the negative lens component having strongly negative refractive power at a position relatively on the image side as described above. If the negative lens component has too strong diverging function, however, it will be difficult to correct spherical aberration and coma. For this reason, the zoom lens system according to the present invention is designed in such a manner that distance l between the rear focal point of said lens system to the object side surface of said negative lens component satisfies the following condition (1):

$$1.5f_{IV} < l < 2.2f_{IV} \qquad (1)$$

wherein the reference symbol $f_{IV}$ represents focal length of the fourth lens group.

If l is shorter than the lower limit of the condition (1), the negative lens component will have too small radii of curvature on both the surfaces (especially radius of curvature on the object side surface), thereby allowing higher order spherical aberration and higher order coma to be easily produced. If the upper limit of the condition (1) is exceeded, in contrast, total length of the lens system as a whole will be prolonged.

Further, it is desirable for prolonging back focal distance of the lens system to select airspace D between front subunit IVa and rear subunit IVb of the fourth lens unit within the range defined below:

$$0.14f_{IV} < D < 0.5f_{IV} \qquad (2)$$

If the airspace D is narrower than the lower limit $0.14f_{IV}$ of the condition (2), it is necessary for prolonging the back focal distance of the lens system to increase the powers of the front subunit IVa and rear subgroup IVb of the fourth lens unit, thereby allowing higher order spherical aberration and higher order coma to be easily produced. In addition, it is impossible to reserve an airspace sufficient for focusing by shifting the rear subunit as described later. If D exceeds the upper limit $0.5f_{IV}$ of the condition (2), total length of the lens system as a whole is apt to be prolonged.

Though the lens system according to the present invention can be focused by sifting its first lens unit, said lens system adopts the system ranging from the first lens component to the front subunit of the fourth lens unit designed as an afocal system in order to suppress variations of aberrations when said lens system adopts rear focusing method by sifting the rear subunit in the fourth lens group.

In order to make applicable the above-described focusing method using the rear subunit IVb, the system ranging from the first lens unit I to the front subunit IVa of the fourth lens unit (the system indicated by A in the drawings) is designed as an afocal system in the zoom lens system according to the present invention. Further, in order to accomplish one of the objects of the present invention to provide a zoom lens system having a back focal distance longer than $0.9f_S$, total focal length $f_A$ of said system A (the system ranging from the first lens unit I to the front subunit IVa of the fourth lens unit) must satisfy the following condition (3):

$$-0.3 < f_W/f_A < 0.3 \qquad (3)$$

wherein the reference symbol $f_W$ represents the shortest focal length of the zoom lens system as a whole.

If $f_W/f_A$ is smaller than the lower limit of the condition (3), spherical aberration is apt to be overcorrected when the zoom lens system is focused on an object located at a short distance. If the upper limit of the condition (3) is exceeded, in contrast, spherical aberration is apt to be undercorrected and, at the same time, it will be difficult to obtain a back focal distance exceeding $0.9f_S$.

When the zoom lens system according to the present invention is focused by shifting the rear subgroup IVb of the fourth lens unit as described above, the rear subunit IVb should desirably comprise lens components in a number as small as possible. So far as the lens system satisfies the condition (3), it is practicaly useable even when the rear subunit consist only of a single-element lens component. When variation of astigmatism is taken into consideration, howwever, the rear subunit IVb should desirably consist of two or three positive lens components. In order to minimize variation of astigmatism, it is desirable to design the positive lens component arranged on the extreme object side in said rear subunit IVb so as to have a shape concentrical with the exit pupil. For this purpose, the positive lens component should desirably have an image side surface with a negative radius of curvature which is small in absolute value. Further, the positive lens component arranged on the extreme image side should have a concave object side surface with a radius of curvature smaller than that on the image side surface thereof. This is advantageous also for correcting spherical aberration to obtain a zoom lens system having an aperture ratio exceeding F/2.0.

In order to prolong the back focal distance, it is advantageous to define the upper limit of the conditions (3) as 0.2.

The present invention has been achieved to provide a zoom lens system having performance sufficiently or excessively high enough for the current or future electronic imaging device. For this purpose, the zoom lens system according to the present invention has adopted a composition wherein a positive cemented doublet comprising a negative meniscus lens element and a biconvex lens element, and a positive single-element meniscus lens component are arranged in the order from object side in the first lens unit I, a negative single-element meniscus lens component and a negative cemented doublet comprising a biconcave lens element and a positive lens element are arranged in the second lens unit II, and at least one negative lens component is arranged in the third lens unit.

Further, selected for the front subunit IVa of the fourth lens group is a composition comprising three to five lens components; a positive lens component, a positive lens component and a negative lens component, or a positive lens component, a positive lens component, a negative lens component and a positive lens component, or a positive lens component, a positive lens component, a positive lens component and a negative lens component. Furthermore, selected for the rear subunit IVb is a composition comprising two positive lens component, or a negative lens component and two or three positive lens components.

The zoom lens system according to the present invention is so designed as to satisfy the following conditions (4) and (5):

$$2.5 f_W < f_I < 3.5 f_W \quad (4)$$

$$-1.2 f_W < f_{II} < -0.8 f_W \quad (5)$$

wherein the reference symbol $f_I$ represents focal length of the first lens group I and the reference symbol $f_{II}$ designates focal length of the second lens unit II.

The condition (4) defines focal length $f_I$ of the first lens unit I. If the focal length $f_I$ is longer than the upper limit of the condition (4), total length of the varifocal system will be prolonged. If the focal length is shorter than the lower limit of the condition (4), in contrast, the radius of curvature is minimized on each lens surface in the first lens unit I and, each lens must be undesirably thickened for obtaining the required lens diameter. In addition, aberrations, especially spherical aberration and coma, will be aggravated too much for favorable correction.

The condition (5) defines focal length $f_{II}$ of the second lens group II. If $f_{II}$ is shorter than the upper limit of the condition (5), it will be desirable for shortening the total length of the varifocal subsystem but will allow remarkable variations of aberrations to be caused by zooming. If $f_{II}$ is longer than the lower limit of the condition (5), in contrast, the total length of the varifocal subsystem will be prolonged.

When the first lens group I and second lens unit II have too strong powers respectively, the offaxial ray will form a large angle with the optical axis between both the lens units and the entrance pupil is deviated toward the image side unless the airspace is narrowed between both the lens units, thereby obliging to enlarge the diameter of the front lens component of the first lens unit.

The zoom lens system according to the present invention is capable of correcting aberrations more favorably when it is designed so as to satisfy the following condition (6) through (9):

$$1.7 < n_4 \quad (6)$$

$$0.05 < n_6 - n_5 \quad (7)$$

$$1.6 < n_5 \quad (8)$$

$$13 < \nu_5 - \nu_6 \quad (9)$$

wherein the reference symbol $n_4$ represents refractive index of the negative meniscus lens component arranged in the second lens unit II, the reference symbols $n_5$ and $\nu_5$ designate refractive index and Abbe's number respectively of the biconcave lens element arranged in the second lens unit II, and the reference symbols $n_6$ and $\nu_6$ denote refractive index and Abbe's number respectively of the positive lens element arranged in the second lens unit II.

The conditions (6) and (8) define refractive indices of the negative lens elements respectively arranged in the second lens unit II. These negative lens elements are made of materials having large refractive indices or so designed as to have large radii of curvature on the surfaces thereof mainly for minimizing spherical aberration and prevent variations of aberrations from being caused by shifting the second lens unit. If these conditions are not satisfied, aberrations will be varied remarkably.

The condition (7) has been adopted for imparting an aberration correcting function to the cemented surface of the negative cemented doublet arranged in the second lens unit. If the difference between the refractive indices of the two lens elements of the cemented doublet is too small to satisfy the condition (8), the aberration correcting function of the cemented surface is weakened and aberrations must be corrected with the other lens components.

The condition (9) has been adopted for correcting chromatic aberration. If the condition (9) is not satisfied, chromatic aberration will be varied remarkably by zooming. Speaking more concretely, paraxial chromatic aberration will be undercorrected at short wavelengths and lateral chromatic aberration will be overcorrected as the zoom lens system is varied from its wide position to tele position.

For enhancing performance of the zoom lens system according to the present invention, it is desirable to design it so as to satisfy the following conditions (10) and (11):

$$n_{IV_n} > 1.78 \quad (10)$$

$$\nu_{IV_{ap}} < \nu_{IV_{bp}} \quad (11)$$

wherein the reference symbol $n_{IV_n}$ represents a mean refractive index of the negative lens elements arranged in the fourth lens unit IV, the reference symbol $\nu_{IV_{ap}}$ designates a mean Abbe's number of the positive lens elements arranged in the front subunit IVa of the fourth lens unit, and the reference symbol $\nu_{IV_{bp}}$ denotes a mean Abbe's number of the positive lens elements arranged in the rear subunit IVb of the fourth lens unit.

In a zoom lens system such as the one disclosed by the present invention, the greatest cause for producing higher order spherical aberration and higher order coma is attributable to the small radii of curvature on the negative lens elements arranged in the fourth relay lens group. Therefore, these negative lens elements should desirably have large refractive indices. If the above-mentioned condition (10) is not satisfied, the negative lens elements will have too small a radii of curvature to prevent higher order spherical aberration and higher order coma from being produced.

The condition (11) has been adopted for correcting lateral chromatic aberration. If the condition (11) is not satisfied, lateral chromatic aberration will be undercorrected though longitudinal chromatic aberration can be corrected favorably.

In order to further prolong the back focal distance of the zoom lens system according to the present invention while maintaining its short total length and favorably corrected aberrations, it is desirable to design it so as to satisfy the following conditions (12) through (14) as examplified in Embodiments 1 through 5 described later.

$$0.5f_S < f_{IVa} < 1.6f_S \quad (12)$$

$$0.42f_S < |f_{IVan}| < 0.64f \quad (13)$$

$$t_B < 0.45f_S \quad (14)$$

wherein the reference symbol $f_{IVa}$ represents focal length of the front subunit IVa of the fourth lens group, the reference symbol $f_{IVan}$ designates focal length of the negative lens component arranged in said front subunit IVa and the reference symbol $t_B$ denotes distance as measured from the extreme object side surface to the extreme image side surface of the rear subgroup IVb of the fourth lens unit.

If the focal length of the front subunit IVa of the fourth lens unit is longer than the upper limit of the condition (12), total length of the relay lens system will be prolonged. If the focal length is shorter than the lower limit of the condition (12), in contrast, back focal distance of the zoom lens system as a whole is apt to be shortened.

If absolute value $f_{IVan}$ of the focal length of the negative lens component arranged in said front subgroup IVa is longer than the upper limit of the condition (13), back focal distance of the zoom lens system as a whole is apt to be shortened. If the absolute value is smaller than the lower limit of the condition (13), in contrast, zonal aberration will be remarkable produced and higher order aberrations are apt to be produced.

The zoom lens system according to the present invention can be focused by shifting the first lens unit I frontward. Further, said zoom lens system can be focused on an object located at a short distance by shifting the rear subunit IVb of the fourth lens unit frontward.

For focusing by the rear focusing method, it is desirable to arrange two or three positive lens components in the rear subunit IVb of the fourth lens unit. In this case, said rear subunit should desirably satisfy the above-mentioned condition (14). If the condition (14) is not satisfied, weight of said rear subunit will not be light and undesirable for rear focusing.

BRIEF DESCRIPTION OF THE DRAWINGS

FIG. 6 through FIG. 8 show curves illustrating aberration characteristics of the Embodiment 1 when it is focused on an object located at infinite distance;

FIG. 9 through FIG. 11 show curves illustrating aberration characteristics of the Embodiment 2 when it is focused on an object locased at infinite distance;

FIG. 12 through FIG. 14 show curves illustrating aberration characteristics of the Embodiment 3 when it is focused on an object located at infinite distance;

FIG. 18 through FIG. 20 show curves illustrating aberration characteristics of the Embodiment 5 when it is focused on an object located at infinite distance;

FIG. 21 through FIG. 23 show curves illustrating aberration characteristics of the Embodiment 6 when it is focused on an object located at infinite distance;

FIG. 24 through FIG. 26 show curves illustrating aberration characteristics of the Embodiment 7 when it is focused on an object located at infinite distance;

FIG. 27 through FIG. 29 show curves illustrating aberration characteristics of the Embodiment 8 when it is focused on an object located at infinite distance;

FIG. 33 through FIG. 35 show curves illustrating aberration characteristics of the Embodiment 2 when it is focused on an object located at a short distance;

FIG. 36 through FIG. 38 show curves illustrating aberration characteristics of the Embodiment 3 when it is focused on an object located at a short distance;

FIG. 42 through FIG. 44 show curves illustrating aberration characteristics of the Embodiment 5 when it is focused on an object located at a short distance;

FIG. 45 through FIG. 47 show curves illustrating aberration characteristics of the Embodiment 6 when it is focused on an object located at a short distance;

FIG. 48 through FIG. 50 show curves illustrating aberration characteristics of the Embodiment 7 when it is focused on an object located at a short distance; and FIG. 51 through FIG. 53 show curves illustrating aberration characteristics of the Embodiment 8 when it is focused on an object located at a short distance.

DETAILED DESCRIPTION OF THE PREFERRED EMBODIMENTS

Figure 1:
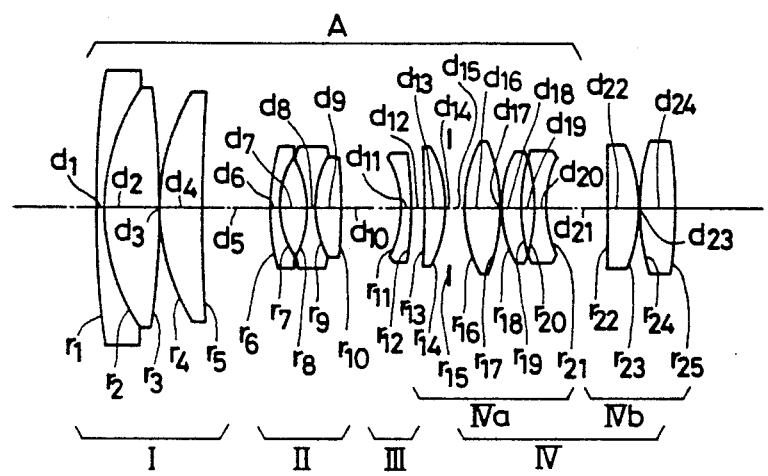
FIG. 1 shows a sectional view illustrating the composition of the zoom lens system preferred as Embodiment 1 of the present invention.

Now, numerical data will be described below as preferred embodiments of the zoom lens system according to the present invention:

Embodiment 1
$f = 14 \sim 24.25 \sim 42$ $r_1 = 145.4589$
$d_1 = 1.1600 \quad n_1 = 1.80518 \quad v_1 = 25.43$
$r_2 = 28.8038$
$d_2 = 7.3000 \quad n_2 = 1.62012 \quad v_2 = 49.66$
$r_3 = -124.4191$
$d_3 = 0.1700$
$r_4 = 28.0380$
$d_4 = 5.6000 \quad n_3 = 1.62045 \quad v_3 = 38.12$
$r_5 = 194.2344$
$d_5 = 0.6000 \sim 9.404 \sim 16.075$
$r_6 = 27.2667$
$d_6 = 1.0400 \quad n_4 = 1.78590 \quad v_4 = 44.18$
$r_7 = 10.3892$
$d_7 = 3.9500$
$r_8 = -15.8056$
$d_8 = 1.0400 \quad n_5 = 1.70154 \quad v_5 = 41.21$
$r_9 = 13.5487$
$d_9 = 3.4000 \quad n_6 = 1.84666 \quad v_6 = 23.88$
$r_{10} = -92.7796$
$d_{10} = 17.4871 \sim 8.204 \sim 2.434$
$r_{11} = -11.9646$
$d_{11} = 1.0000 \quad n_7 = 1.71300 \quad v_7 = 53.84$
$r_{12} = -42.5665$ -continued

| | | | |
|---|---|---|---|
| $d_{12} = 1.2558 \sim 1.725 \sim 0.855$ | | | |
| $r_{13} = -85.6664$ | | | |
| $d_{13} = 2.7002$ | $n_8 = 1.59270$ | | $\nu_8 = 35.29$ |
| $r_{14} = -17.9449$ | | | |
| $d_{14} = 0.8553$ | | | |
| $r_{15} = \infty$ (stop) | | | |
| $d_{15} = 2.0000$ | | | |
| $r_{16} = 21.1736$ | | | |
| $d_{16} = 4.5115$ | $n_9 = 1.62230$ | | $\nu_9 = 53.20$ |
| $r_{17} = -27.2639$ | | | |
| $d_{17} = 0.2100$ | | | |
| $r_{18} = 14.3135$ | | | |
| $d_{18} = 3.1600$ | $n_{10} = 1.51742$ | | $\nu_{10} = 52.41$ |
| $r_{19} = 115.7820$ | | | |
| $d_{19} = 1.2000$ | | | |
| $r_{20} = -25.5498$ | | | |
| $d_{20} = 1.6617$ | $n_{11} = 1.84666$ | | $\nu_{11} = 23.88$ |
| $r_{21} = 15.2150$ | | | |
| $d_{21} = 8.5579$ | | | |
| $r_{22} = 2332.0237$ | | | |
| $d_{22} = 4.2478$ | $n_{12} = 1.51112$ | | $\nu_{12} = 60.48$ |
| $r_{23} = -20.8501$ | | | |
| $d_{23} = 0.1342$ | | | |
| $r_{24} = 33.8590$ | | | |
| $d_{24} = 4.6445$ | $n_{13} = 1.48749$ | | $\nu_{13} = 70.15$ |
| $r_{25} = -61.6882$ | | | |

$1/f_{IV} = 1.852$, $D/f_{IV} = 0.385$, $f_W/f_A = -0.197$
$f_{IVa}/f_S = 0.667$, $f_{IVan}/f_S = -0.456$
$f_I/f_W = 3.061$, $f_{II}/f_W = -0.999$, $n_4 = 1.78590$
$n_6 - n_5 = 0.14512$, $n_5 = 1.70154$
$\nu_5 - \nu_6 = 17.33$, $n_I/n = 1.84666$
$\nu_{IVap} - \nu_{IVbp} = -18.348$, $f_B = 23.3$
$t_B/f_S = 0.3722$

Embodiment 2
$f = 14 \sim 24.25 \sim 42$

| | | | |
|---|---|---|---|
| $r_1 = 84.1276$ | | | |
| $d_1 = 1.1600$ | $n_1 = 1.80518$ | | $\nu_1 = 25.43$ |
| $r_2 = 29.0902$ | | | |
| $d_2 = 7.3000$ | $n_2 = 1.62012$ | | $\nu_2 = 49.66$ |
| $r_3 = -273.1915$ | | | |
| $d_3 = 0.1700$ | | | |
| $r_4 = 28.7778$ | | | |
| $d_4 = 5.6000$ | $n_3 = 1.62012$ | | $\nu_3 = 49.66$ |
| $r_5 = 203.0683$ | | | |
| $d_5 = 0.6000 \sim 8.838 \sim 14.867$ | | | |
| $r_6 = 29.7145$ | | | |
| $d_6 = 1.0400$ | $n_4 = 1.73400$ | | $\nu_4 = 51.49$ |
| $r_7 = 11.3398$ | | | |
| $d_7 = 3.9500$ | | | |
| $r_8 = -21.5403$ | | | |
| $d_8 = 1.0400$ | $n_5 = 1.69350$ | | $\nu_5 = 53.23$ |
| $r_9 = 15.9303$ | | | |
| $d_9 = 3.1000$ | $n_6 = 1.84666$ | | $\nu_6 = 23.88$ |
| $r_{10} = 1554.6274$ | | | |
| $d_{10} = 12.9984 \sim 5.073 \sim 2.828$ | | | |
| $r_{11} = -14.7944$ | | | |
| $d_{11} = 1.0000$ | $n_7 = 1.69680$ | | $\nu_7 = 55.52$ |
| $r_{12} = -36.0319$ | | | |
| $d_{12} = 4.9325 \sim 4.598 \sim 0.854$ | | | |
| $r_{13} = 50.3787$ | | | |
| $d_{13} = 2.6753$ | $n_8 = 1.74950$ | | $\nu_8 = 35.27$ |
| $r_{14} = -29.8033$ | | | |
| $d_{14} = 0.6469$ | | | |
| $r_{15} = \infty$ (stop) | | | |
| $d_{15} = 2.0000$ | | | |
| $r_{16} = 20.2193$ | | | |
| $d_{16} = 5.3125$ | $n_9 = 1.69350$ | | $\nu_9 = 53.23$ |
| $r_{17} = -440.8891$ | | | |
| $d_{17} = 0.8000$ | | | |
| $r_{18} = -25.3662$ | | | |
| $d_{18} = 1.4008$ | $n_{10} = 1.84666$ | | $\nu_{10} = 23.88$ |
| $r_{19} = 18.0976$ | | | |
| $d_{19} = 1.8984$ | | | |
| $r_{20} = 104.9452$ | | | |
| $d_{20} = 3.0000$ | $n_{11} = 1.56873$ | | $\nu_{11} = 63.16$ |
| $r_{21} = -33.8872$ | | | |
| $d_{21} = 6.0137$ | | | |
| $r_{22} = -1877.6563$ | | | |
| $d_{22} = 3.6497$ | $n_{12} = 1.48749$ | | $\nu_{12} = 70.15$ |
| $r_{23} = -18.1673$ | | | |
| $d_{23} = 0.1342$ | | | |
| $r_{24} = 27.7264$ | | | |
| $d_{24} = 3.3156$ | $n_{13} = 1.48749$ | | $\nu_{13} = 70.51$ |
| $r_{25} = -111.3847$ | | | |

$1/f_{IV} = 1.642$, $D/f_{IV} = 0.237$, $f_W/f_A = -0.221$
$f_{IVa}/f_S = 1.186$, $f_{IVan}/f_S = -0.507$
$f_I/f_W = 2.996$, $F_{II}/f_W = -1.098$, $n_4 = 1.73400$
$n_6 - n_5 = 0.15316$, $n_5 = 1.69350$,
$\nu_5 - \nu_6 = 29.35$, $n_I/n = 1.84666$, $t_B/f_S = 0.2928$
$\nu_{IVap} - \nu_{IVbp} = -19.597$, $f_B = 23.3$

Embodiment 3
$f = 14 \sim 24.25 \sim 42$

| | | | |
|---|---|---|---|
| $r_1 = 82.8380$ | | | |
| $d_1 = 1.1600$ | $n_1 = 1.80518$ | | $\nu_1 = 25.43$ |
| $r_2 = 28.9584$ | | | |
| $d_2 = 7.3000$ | $n_2 = 1.62012$ | | $\nu_2 = 49.66$ |
| $r_3 = -243.9198$ | | | |
| $d_3 = 0.1700$ | | | |
| $r_4 = 28.9601$ | | | |
| $d_4 = 5.6000$ | $n_3 = 1.62374$ | | $\nu_3 = 47.10$ |
| $r_5 = 203.8797$ | | | |
| $d_5 = 0.6000 \sim 8.647 \sim 14.529$ | | | |
| $r_6 = 29.0358$ | | | |
| $d_6 = 1.0400$ | $n_4 = 1.73400$ | | $\nu_4 = 51.49$ |
| $r_7 = 11.4509$ | | | |
| $d_7 = 3.9500$ | | | |
| $r_8 = -21.5434$ | | | |
| $d_8 = 1.0400$ | $n_5 = 1.69680$ | | $\nu_5 = 55.52$ |
| $r_9 = 16.1419$ | | | |
| $d_9 = 3.1000$ | $n_6 = 1.84666$ | | $\nu_6 = 23.88$ |
| $r_{10} = 327.0857$ | | | |
| $d_{10} = 12.7201 \sim 4.953 \sim 2.849$ | | | |
| $r_{11} = -15.1829$ | | | |
| $d_{11} = 1.0000$ | $n_7 = 1.69680$ | | $\nu_7 = 55.52$ |
| $r_{12} = -38.3036$ | | | |
| $d_{12} = 4.8880 \sim 4.594 \sim 0.854$ | | | |
| $r_{13} = 50.2085$ | | | |
| $d_{13} = 2.6726$ | $n_8 = 1.76200$ | | $\nu_8 = 40.10$ |
| $r_{14} = -29.8907$ | | | |
| $d_{14} = 0.6433$ | | | |
| $r_{15} = \infty$ (stop) | | | |
| $d_{15} = 2.0000$ | | | |
| $r_{16} = 20.1914$ | | | |
| $d_{16} = 5.5367$ | $n_9 = 1.69680$ | | $\nu_9 = 55.52$ |
| $r_{17} = 2178.6990$ | | | |
| $d_{17} = 0.8000$ | | | |
| $r_{18} = -25.1867$ | | | |
| $d_{18} = 1.4025$ | $n_{10} = 1.84666$ | | $\nu_{10} = 23.88$ |
| $r_{19} = 18.2541$ | | | |
| $d_{19} = 1.8967$ | | | |
| $r_{20} = 89.3959$ | | | |
| $d_{20} = 3.0000$ | $n_{11} = 1.62041$ | | $\nu_{11} = 60.27$ |
| $r_{21} = -41.7577$ | | | |
| $d_{21} = 6.1391$ | | | |
| $r_{22} = -2160.7673$ | | | |
| $d_{22} = 3.6490$ | $n_{12} = 1.56873$ | | $\nu_{12} = 63.16$ |
| $r_{23} = -20.1024$ | | | |
| $d_{23} = 0.1342$ | | | |
| $r_{24} = 28.7875$ | | | |
| $d_{24} = 3.3002$ | $n_{13} = 1.48749$ | | $\nu_{13} = 70.15$ |
| $r_{25} = -98.5889$ | | | |

$1/f_{IV} = 1.752$, $D/f_{IV} = 0.258$, $f_W/f_A = -0.253$
$f_{IVa}/f_S = 1.180$, $f_{IVan}/f_S = -0.508$
$f_I/f_W = 2.951$, $f_{II}/f_W = -1.068$, $n_4 = 1.73400$
$n_6 - n_5 = 0.14986$, $n_5 = 1.69680$
$\nu_5 - \nu_6 = 31.64$, $n_I/n = 1.84666$, $t_B/f_S = 0.2921$
$\nu_{IVap} - \nu_{IVbp} = -14.692$, $f_B = 23.3$

Embodiment 4
$f = 14 \sim 24.25 \sim 42$

| | | | |
|---|---|---|---|
| $r_1 = 83.0383$ | | | |
| $d_1 = 1.1600$ | $n_1 = 1.80518$ | | $\nu_1 = 25.43$ |
| $r_2 = 29.1400$ | | | |
| $d_2 = 7.3000$ | $n_2 = 1.62012$ | | $\nu_2 = 49.66$ |
| $r_3 = -253.150$ | | | |
| $d_3 = 0.1700$ | | | |
| $r_4 = 28.6874$ | | | |
| $d_4 = 5.6000$ | $n_3 = 1.62012$ | | $\nu_3 = 49.66$ |
| $r_5 = 210.2929$ | | | |
| $d_5 = 0.6000 \sim 8.638 \sim 14.534$ | | | |
| $r_6 = 30.3630$ | | | |
| $d_6 = 1.0400$ | $n_4 = 1.73400$ | | $\nu_4 = 51.49$ |

-continued

| | | |
|---|---|---|
| $r_7 = 11.3638$ | | |
| $d_7 = 3.9500$ | | |
| $r_8 = -21.4761$ | | |
| $d_8 = 1.0400$ | $n_5 = 1.69350$ | $v_5 = 53.23$ |
| $r_9 = 17.0207$ | | |
| $d_9 = 3.1000$ | $n_6 = 1.84666$ | $v_6 = 23.88$ |
| $r_{10} = 1069.1825$ | | |
| $d_{10} = 13.0418 \sim 5.272 \sim 2.789$ | | |
| $r_{11} = -14.1675$ | | |
| $d_{11} = 1.0000$ | $n_7 = 1.69680$ | $v_7 = 55.52$ |
| $r_{12} = -36.2700$ | | |
| $d_{12} = 4.5289 \sim 4.243 \sim 0.854$ | | |
| $r_{13} = 55.6389$ | | |
| $d_{13} = 2.6729$ | $n_8 = 1.74950$ | $v_8 = 35.27$ |
| $r_{14} = -31.9536$ | | |
| $d_{14} = 0.6353$ | | |
| $r_{15} = \infty$ (stop) | | |
| $d_{15} = 2.0000$ | | |
| $r_{16} = 21.0858$ | | |
| $d_{16} = 5.0173$ | $n_9 = 1.69350$ | $v_9 = 53.23$ |
| $r_{17} = -708.9650$ | | |
| $d_{17} = 0.8000$ | | |
| $r_{18} = -27.0343$ | | |
| $d_{18} = 1.4021$ | $n_{10} = 1.84666$ | $v_{10} = 23.88$ |
| $r_{19} = 19.1950$ | | |
| $d_{19} = 1.9053$ | | |
| $r_{20} = 45.3739$ | | |
| $d_{20} = 3.0000$ | $n_{11} = 1.56873$ | $v_{11} = 63.16$ |
| $r_{21} = -24.8871$ | | |
| $d_{21} = 6.6760$ | | |
| $r_{22} = -119.5541$ | | |
| $d_{22} = 3.6491$ | $n_{12} = 1.48749$ | $v_{12} = 70.15$ |
| $r_{23} = -20.3750$ | | |
| $d_{23} = 0.1342$ | | |
| $r_{24} = 28.5509$ | | |
| $d_{24} = 3.3004$ | $n_{13} = 1.48749$ | $v_{13} = 70.15$ |
| $r_{25} = -144.4908$ | | |

$1/f_{IV} = 1.863$, $D/f_{IV} = 0.296$, $f_W/f_A = -0.016$
$f_{IVa}/f_S = 1.071$, $f_{IVan}/f_S = -0.539$
$f_I/f_W = 2.939$, $f_{II}/f_W = -1.071$, $n_4 = 1.73400$
$n_6 - n_5 = 0.15316$, $n_5 = 1.69350$
$v_5 - v_6 = 29.35$, $n_{IV_n} = 1.84666$, $t_B/f_S = 0.2921$
$v_{IVap} - v_{IVbp} = -19.597$, $f_B = 23.3$

Embodiment 5
$f = 14 \sim 24.25 \sim 42$

| | | |
|---|---|---|
| $r_1 = 82.6129$ | | |
| $d_1 = 1.1600$ | $n_1 = 1.80518$ | $v_1 = 25.43$ |
| $r_2 = 29.2181$ | | |
| $d_2 = 7.3000$ | $n_2 = 1.62012$ | $v_2 = 49.66$ |
| $r_3 = -246.0953$ | | |
| $d_3 = 0.1700$ | | |
| $r_4 = 28.4664$ | | |
| $d_4 = 5.6000$ | $n_3 = 1.62012$ | $v_3 = 49.66$ |
| $r_5 = 217.2658$ | | |
| $d_5 = 0.600 \sim 8.516 \sim 14.296$ | | |
| $r_6 = 34.0022$ | | |
| $d_6 = 1.0400$ | $n_4 = 1.73400$ | $v_4 = 51.49$ |
| $r_7 = 11.4972$ | | |
| $d_7 = 3.9500$ | | |
| $r_8 = -20.9945$ | | |
| $d_8 = 1.0400$ | $n_5 = 1.69350$ | $v_5 = 53.23$ |
| $r_9 = 16.3829$ | | |
| $d_9 = 3.1000$ | $n_6 = 1.84666$ | $v_6 = 23.88$ |
| $r_{10} = 646.6454$ | | |
| $d_{10} = 12.8886 \sim 5.006 \sim 2.865$ | | |
| $r_{11} = -14.2623$ | | |
| $d_{11} = 1.0000$ | $n_7 = 1.69680$ | $v_7 = 55.52$ |
| $r_{12} = -30.9806$ | | |
| $d_{12} = 4.5293 \sim 4.484 \sim 0.854$ | | |
| $r_{13} = 50.7675$ | | |
| $d_{13} = 2.6656$ | $n_8 = 1.74950$ | $v_8 = 35.27$ |
| $r_{14} = -30.6539$ | | |
| $d_{14} = 0.5921$ | | |
| $r_{15} = \infty$ (stop) | | |
| $d_{15} = 2.0000$ | | |
| $r_{16} = 19.1840$ | | |
| $d_{16} = 5.6618$ | $n_9 = 1.69350$ | $v_9 = 53.23$ |
| $r_{17} = 3649.8366$ | | |
| $d_{17} = 0.8000$ | | |
| $r_{18} = -24.4207$ | | |
| $d_{18} = 1.4073$ | $n_{10} = 1.84666$ | $v_{10} = 23.88$ |

-continued

| | | |
|---|---|---|
| $r_{19} = 18.4904$ | | |
| $d_{19} = 3.8044$ | | |
| $r_{20} = 80.9804$ | | |
| $d_{20} = 3.0000$ | $n_{11} = 1.56873$ | $v_{11} = 63.16$ |
| $r_{21} = -23.6744$ | | |
| $d_{21} = 4.3200$ | | |
| $r_{22} = -81.0091$ | | |
| $d_{22} = 3.6442$ | $n_{12} = 1.48749$ | $v_{12} = 70.15$ |
| $r_{23} = -19.6764$ | | |
| $d_{23} = 0.1342$ | | |
| $r_{24} = 28.3524$ | | |
| $d_{24} = 3.3101$ | $n_{13} = 1.48749$ | $v_{13} = 70.15$ |
| $r_{25} = -150.6774$ | | |

$1/f_{IV} = 1.771$, $D/f_{IV} = 0.184$, $f_W/f_A = 0.010$
$f_{IVa}/f_S = 1.095$, $f_{IVan}/f_S = -0.505$
$f_I/f_W = 2.894$, $f_{II}/f_W = -1.021$, $n_4 = 1.73400$
$n_6 - n_5 = 0.15316$, $n_5 = 1.69350$
$v_5 - v_6$ 29.35, $n_{IV_n} = 1.84666$, $t_B/f_S = 0.2923$
$v_{IVap} - v_{IVbp} = -19.597$, $f_B = 23.3$

Embodiment 6
$f = 14 \sim 24.25 \sim 42$

| | | |
|---|---|---|
| $r_1 = 73.7446$ | | |
| $d_1 = 1.1600$ | $n_1 = 1.80518$ | $v_1 = 25.43$ |
| $r_2 = 29.0371$ | | |
| $d_2 = 7.3000$ | $n_2 = 1.62280$ | $v_2 = 57.06$ |
| $r_3 = -142.5789$ | | |
| $d_3 = 0.1700$ | | |
| $r_4 = 29.7376$ | | |
| $d_4 = 5.6000$ | $n_3 = 1.62012$ | $v_3 = 49.66$ |
| $r_5 = 187.5263$ | | |
| $d_5 = 0.6000 \sim 8.158 \sim 13.563$ | | |
| $r_6 = 761.2471$ | | |
| $d_6 = 1.0400$ | $n_4 = 1.73400$ | $v_4 = 51.49$ |
| $r_7 = 12.6032$ | | |
| $d_7 = 3.9500$ | | |
| $r_8 = -19.9311$ | | |
| $d_8 = 1.0400$ | $n_5 = 1.69350$ | $v_5 = 53.23$ |
| $r_9 = 14.4310$ | | |
| $d_9 = 3.1000$ | $n_6 = 1.84666$ | $v_6 = 23.88$ |
| $r_{10} = -537.6964$ | | |
| $d_{10} = 14.1628 \sim 4.601 \sim 3.099$ | | |
| $r_{11} = -23.9031$ | | |
| $d_{11} = 1.0000$ | $n_7 = 1.69680$ | $v_7 = 55.52$ |
| $r_{12} = -49.2275$ | | |
| $d_{12} = 2.7690 \sim 4.810 \sim 0.854$ | | |
| $r_{13} = 83.5278$ | | |
| $d_{13} = 2.6697$ | $n_8 = 1.73400$ | $v_8 = 51.49$ |
| $r_{14} = -26.0629$ | | |
| $d_{14} = 0.6362$ | | |
| $r_{15} = \infty$ (stop) | | |
| $d_{15} = 2.0000$ | | |
| $r_{16} = 22.6910$ | | |
| $d_{16} = 3.1050$ | $n_9 = 1.69680$ | $v_9 = 52.52$ |
| $r_{17} = 205.0173$ | | |
| $d_{17} = 1.2990$ | | |
| $r_{18} = -23.8698$ | | |
| $d_{18} = 1.0000$ | $n_{10} = 1.84666$ | $v_{10} = 23.88$ |
| $r_{19} = -199.2548$ | | |
| $d_{19} = 8.6005$ | | |
| $r_{20} = 152.2247$ | | |
| $d_{20} = 1.0000$ | $n_{11} = 1.80518$ | $v_{11} = 25.43$ |
| $r_{21} = 26.2448$ | | |
| $d_{21} = 1.9319$ | | |
| $r_{22} = 120.3715$ | | |
| $d_{22} = 4.7975$ | $n_{12} = 1.56873$ | $v_{12} = 63.16$ |
| $r_{23} = -19.9767$ | | |
| $d_{23} = 0.1342$ | | |
| $r_{24} = 23.9392$ | | |
| $d_{24} = 4.6311$ | $n_{13} = 1.48749$ | $v_{13} = 70.15$ |
| $r_{25} = -72.0532$ | | |

$1/f_{IV} = 1.826$, $D/f_{IV} = 0.346$, $f_W/f_A = 0.057$
$f_I/f_W = 2.717$, $f_{II}/f_W = -0.851$, $n_4 = 1.73400$
$n_6 - n_5 = 0.15316$, $n_5 = 1.69350$
$v_5 - v_6 = 29.35$, $n_{IV_n} = 1.82592$
$v_{IVap} - v_{IVbp} = -13.15$, $f_B = 0.95 f_S$

Embodiment 7
$f = 14 \sim 24.25 \sim 42$

| | | |
|---|---|---|
| $r_1 = 73.4599$ | | |
| $d_1 = 1.1600$ | $n_1 = 1.80518$ | $v_1 = 25.43$ |
| $r_2 = 29.7582$ | | |

-continued $d_2 = 7.3000$   $n_2 = 1.62280$   $\nu_2 = 57.06$
$r_3 = -143.3946$
$d_3 = 0.1700$
$r_4 = 29.8304$
$d_4 = 5.6000$   $n_3 = 1.62012$   $\nu_3 = 49.66$
$r_5 = 193.5783$
$d_5 = 0.6000 \sim 8.068 \sim 13.415$
$r_6 = -249.6054$
$d_6 = 1.0400$   $n_4 = 1.73400$   $\nu_4 = 51.49$
$r_7 = 13.4290$
$d_7 = 3.9500$
$r_8 = -22.3190$
$d_8 = 1.0400$   $n_5 = 1.69350$   $\nu_5 = 53.23$
$r_9 = 13.6545$
$d_9 = 3.1000$   $n_6 = 1.84666$   $\nu_6 = 23.88$
$r_{10} = 395.1326$
$d_{10} = 13.8889 \sim 4.363 \sim 3.225$
$r_{11} = -29.6120$
$d_{11} = 1.0000$   $n_7 = 1.69680$   $\nu_7 = 55.52$
$r_{12} = -74.5434$
$d_{12} = 3.0371 \sim 5.106 \sim 0.854$
$r_{13} = 103.8661$
$d_{13} = 2.6656$   $n_8 = 1.72916$   $\nu_8 = 54.68$
$r_{14} = -26.8147$
$d_{14} = 0.5983$
$r_{15} = \infty$ (stop)
$d_{15} = 2.0000$
$r_{16} = 24.1544$
$d_{16} = 3.7803$   $n_9 = 1.69680$   $\nu_9 = 55.52$
$r_{17} = 586.5944$
$d_{17} = 1.2984$
$r_{18} = -21.4118$
$d_{18} = 1.0000$   $n_{10} = 1.84666$   $\nu_{10} = 23.88$
$r_{19} = -175.5530$
$d_{19} = 6.6556$
$r_{20} = 78.7259$
$d_{20} = 1.0000$   $n_{11} = 1.80518$   $\nu_{11} = 25.43$
$r_{21} = 33.7443$
$d_{21} = 1.9815$
$r_{22} = -76.7912$
$d_{22} = 3.8000$   $n_{12} = 1.48749$   $\nu_{12} = 70.15$
$r_{23} = -17.6494$
$d_{23} = 0.1342$
$r_{24} = 51.5682$
$d_{24} = 3.0000$   $n_{13} = 1.48749$   $\nu_{13} = 70.15$
$r_{25} = -54.5234$
$d_{25} = 0.1500$
$r_{26} = 33.6811$
$d_{26} = 3.7439$   $n_{14} = 1.48749$   $\nu_{14} = 70.15$
$r_{27} = 306.4734$
$1/f_{IV} = 1.907$, $D/f_{IV} = 0.284$, $f_W/f_A = -0.078$
$f_I/f_W = 2.696$, $f_{II}/f_W = -0.844$, $n_4 = 1.73400$
$n_6 - n_5 = 0.15316$, $n_5 = 1.69350$
$\nu_5 - \nu_6 = 29.35$, $n_{IVn} = 1.82592$
$\nu_{IVap} - \nu_{IVbp} = -15.05$, $f_B = 0.95 f_S$ Embodiment 8
$f = 14 \sim 24.25 \sim 42$ $r_1 = 73.1407$
$d_1 = 1.1600$   $n_1 = 1.80518$   $\nu_1 = 25.43$
$r_2 = 29.2813$
$d_2 = 7.3000$   $n_2 = 1.62280$   $\nu_2 = 57.06$
$r_3 = -142.5699$
$d_3 = 0.1700$
$r_4 = 29.4855$
$d_4 = 5.6000$   $n_3 = 1.62012$   $\nu_3 = 49.66$
$r_5 = 188.5203$
$d_5 = 0.6000 \sim 8.038 \sim 13.370$
$r_6 = -2148.9531$
$d_6 = 1.0400$   $n_4 = 1.73400$   $\nu_4 = 51.49$
$r_7 = 12.7344$
$d_7 = 3.9500$
$r_8 = -19.2458$
$d_8 = 1.0400$   $n_5 = 1.69350$   $\nu_5 = 53.23$
$r_9 = 14.4976$
$d_9 = 3.1000$   $n_6 = 1.84666$   $\nu_6 = 23.88$
$r_{10} = -336.4032$
$d_{10} = 14.0324 \sim 5.201 \sim 2.643$
$r_{11} = -21.0833$
$d_{11} = 1.0000$   $n_7 = 1.69680$   $\nu_7 = 55.52$
$r_{12} = -51.2968$
$d_{12} = 2.3119 \sim 3.735 \sim 0.854$ -continued $r_{13} = 103.8053$
$d_{13} = 2.6678$   $n_8 = 1.72916$   $\nu_8 = 54.68$
$r_{14} = -34.5149$
$d_{14} = 0.6169$
$r_{15} = \infty$ (stop)
$d_{15} = 2.0000$
$r_{16} = 52.1018$
$d_{16} = 3.3386$   $n_9 = 1.69680$   $\nu_9 = 55.52$
$r_{17} = -58.1766$
$d_{17} = 0.1500$
$r_{18} = 30.8549$
$d_{18} = 3.0000$   $n_{10} = 1.69680$   $\nu_{10} = 55.52$
$r_{19} = 90.7813$
$d_{19} = 1.3000$
$r_{20} = -24.0593$
$d_{20} = 1.0000$   $n_{11} = 1.84666$   $\nu_{11} = 23.88$
$r_{21} = -184.3586$
$d_{21} = 5.8297$
$r_{22} = 136.6332$
$d_{22} = 1.0000$   $n_{12} = 1.80518$   $\nu_{12} = 25.43$
$r_{23} = 27.4732$
$d_{23} = 1.9396$
$r_{24} = 178.2704$
$d_{24} = 4.7972$   $n_{13} = 1.56873$   $\nu_{13} = 63.16$
$r_{25} = -19.8353$
$d_{25} = 0.1342$
$r_{26} = 27.9084$
$d_{26} = 4.6096$   $n_{14} = 1.48749$   $\nu_{14} = 70.15$
$r_{27} = -64.6149$
$1/f_{IV} = 1.860$, $D/f_{IV} = 0.255$, $f_W/f_A = 0.110$
$f_I/f_W = 2.685$, $f_{II}/f_W = -0.840$, $n_4 = 1.73400$
$n_6 - n_5 = 0.15316$, $n_5 = 1.69350$
$\nu_5 - \nu_6 = 29.35$, $n_{IVn} = 1.82592$
$\nu_{IVap} - \nu_{IVbp} = -11.415$, $f_B = 0.95 f_S$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, the reference symbols $\nu_1, \nu_2, \ldots$ represent Abbe's numbers of the respective lens elements, the reference symbol f designates focal length of the zoom lens system as a whole and the reference symbol $f_B$ denotes back focal distance of the zoom lens system as a whole.

Figure 2:
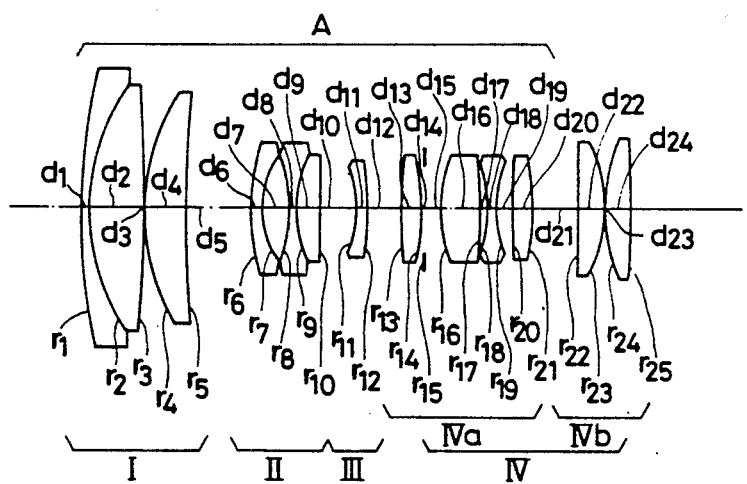
FIG. 2 shows a sectional view illustrating the composition of the zoom lens system preferred as Embodiments 2 through 5 of the present invention.
Figure 6:
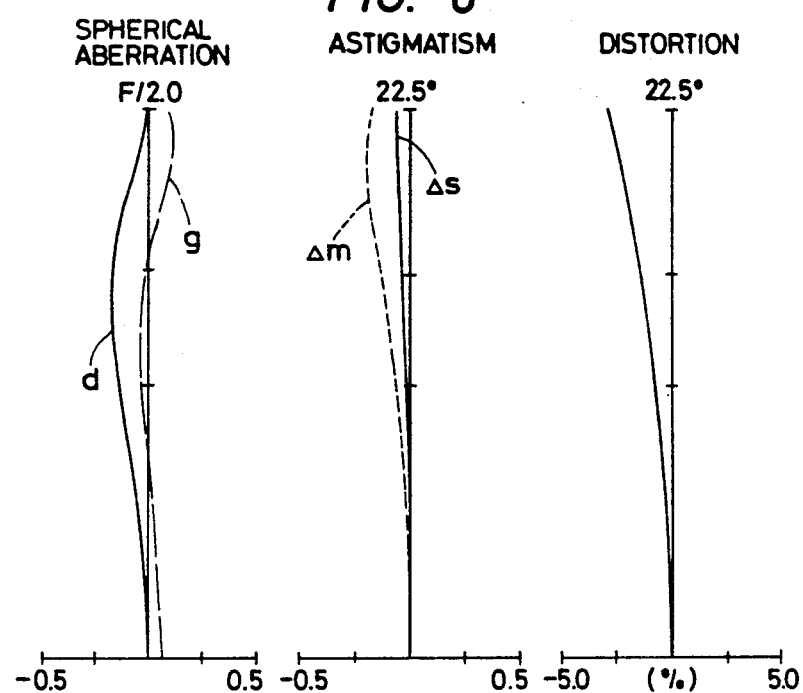
Figure 7:
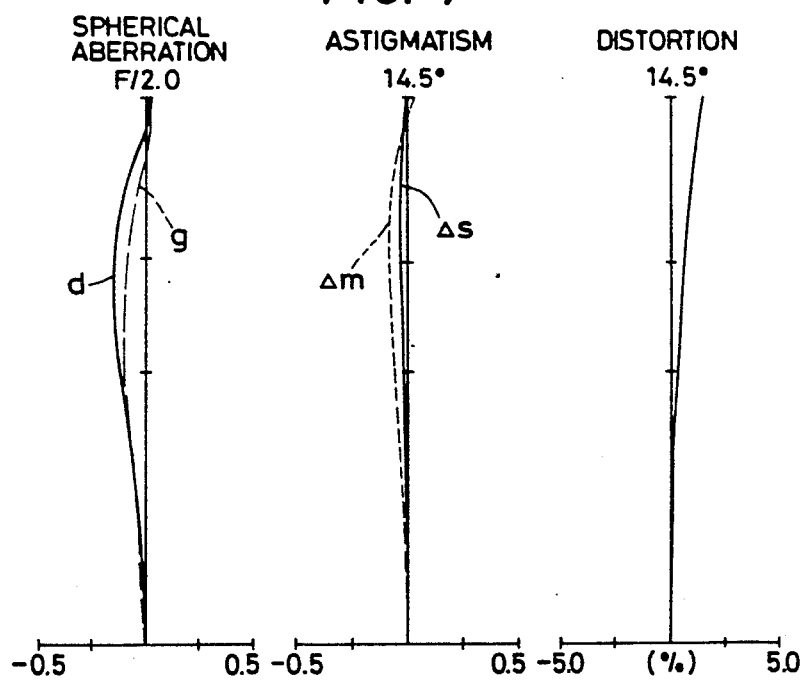
Figure 14:
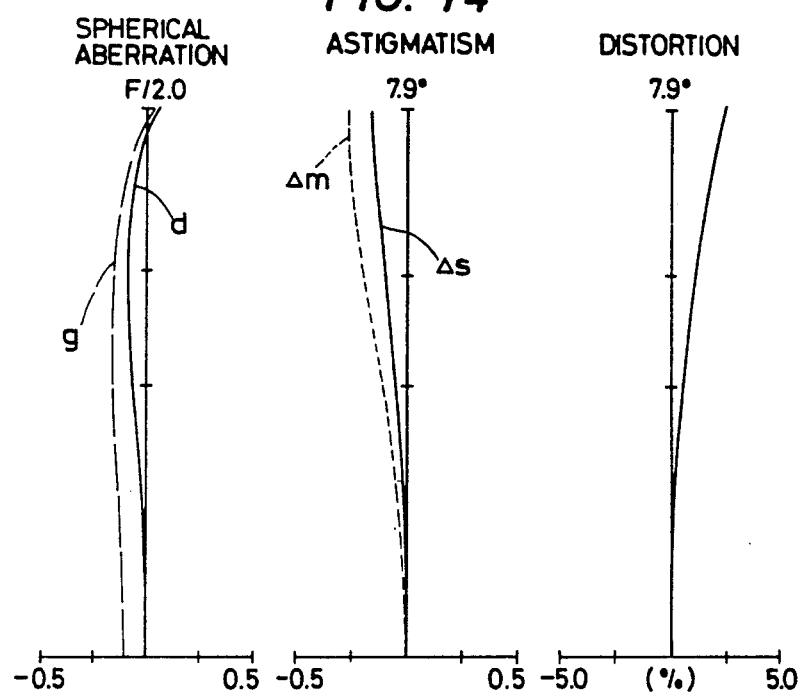
Figure 15:
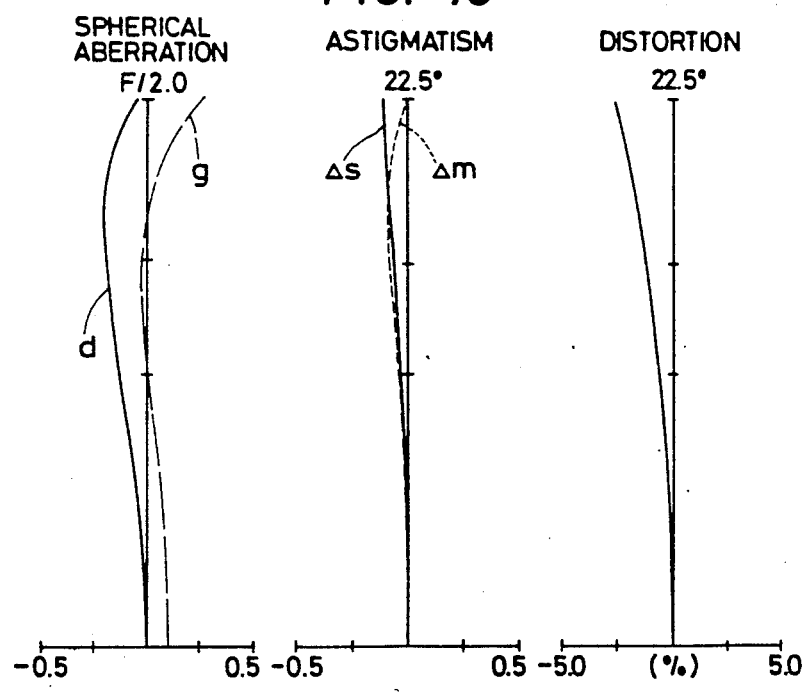
FIG. 15 through FIG. 17 show curves illustrating aberration characteristics of the Embodiment 4 when it is focused on an object located at infinite distance.
Figure 16:
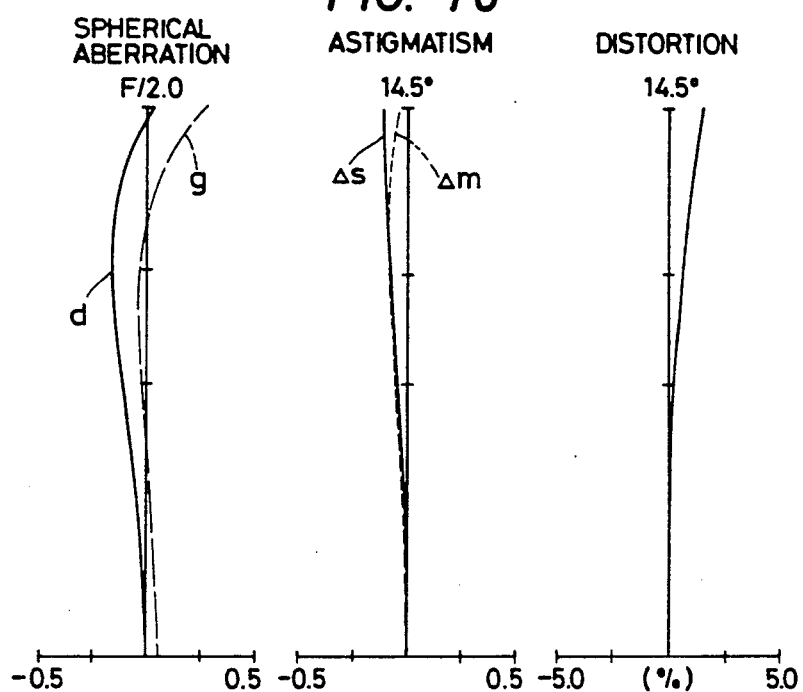
Figure 17:
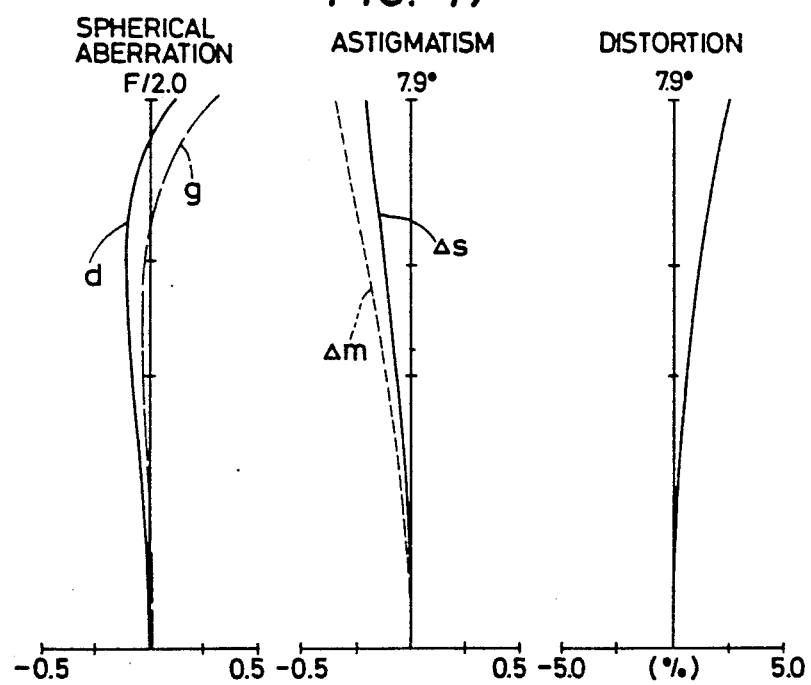

Out of the embodiments described above, the Embodiment 1 has the composition shown in FIG. 1 wherein the front subunit IVa of the fourth lens unit comprises a positive lens component, a positive lens component, a positive lens component and a negative lens component, and the rear subunit IVb comprises two positive lens components. Aberration characteristics of this embodiment are illustrated in FIG. 6 (wide position), FIG. 7 (standard position) and FIG. 8 (tele position). Each of the Embodiments 2 through 5 has the composition shown in FIG. 2 wherein the front subunit IVa of the fourth lens unit comprises a positive lens component, a positive lens component, a negative lens component and a positive lens component, and the rear subunit IVb comprises two positive lens components. Aberration characteristics of these embodiments are illustrated in the following correspondence: the Embodiment 2 in FIG. 9 (wide position), FIG. 10 (standard position) and FIG. 11 (tele position), Embodiment 3 in FIG. 12 (wide position), FIG. 13 (standard position) and FIG. 14 (tele position), the Embodiment 4 in FIG. 15 (wide position), FIG. 16 (standard position) and FIG. 17 (tele position) and the Embodiment 5 in FIG. 18 (wide position), FIG. 19 (standard position) and FIG. 20 (tele position). In addition, these embodiments are so designed as to satisfy the conditions (12), (13) and (14).

Figure 3:
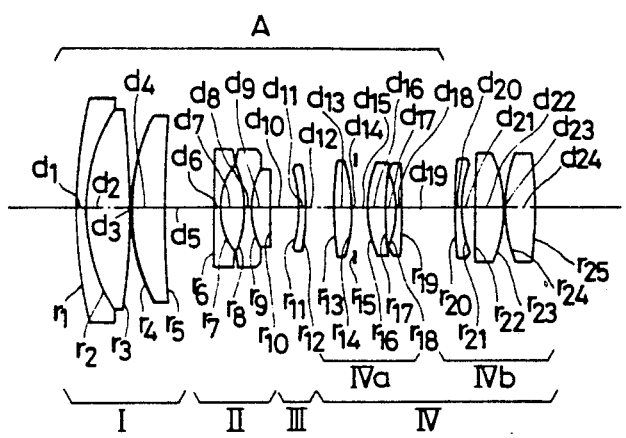
FIG. 3 through FIG. 5 show sectional views illustrating the compositions of the zoom lens systems preferred as Embodiments 6 through 8 respectively of the present invention.
Figure 22:
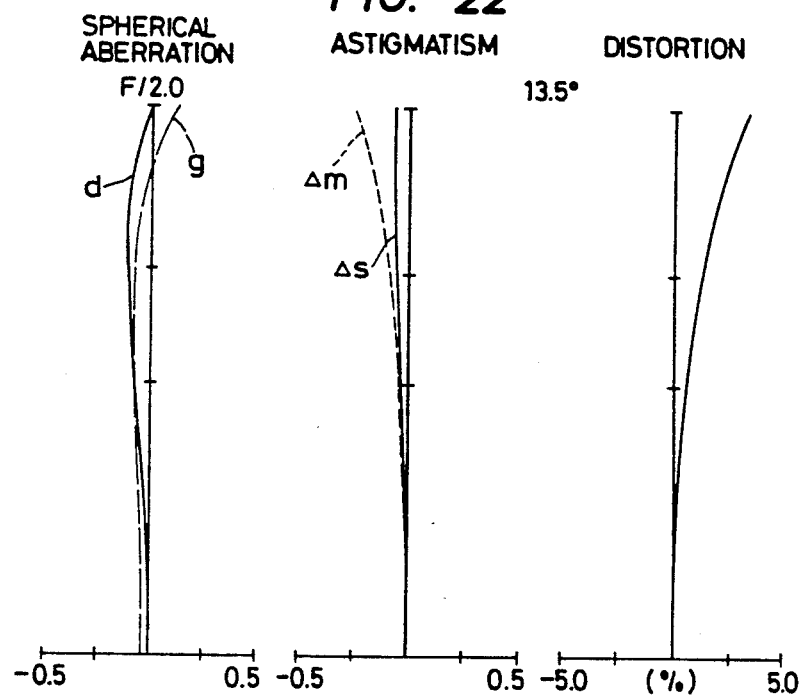
Figure 23:
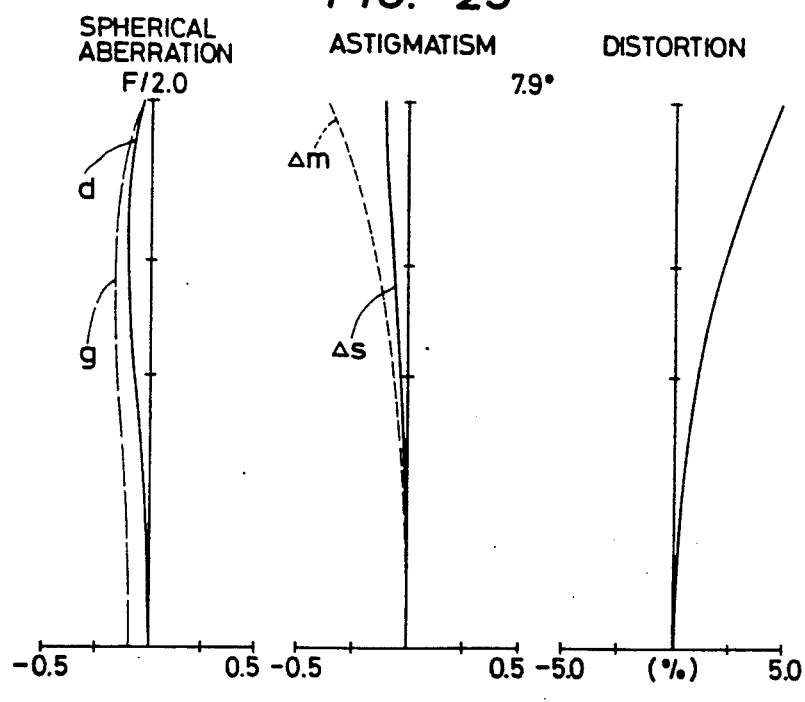

The Embodiment 6 has the composition shown in FIG. 3 wherein the front subunit IVa of the fourth lens unit comprises a positive lens component, a positive lens component having a convex surface with strong refractive power on the object side and a negative lens component having a concave surface with strong refractive power on the object side, whereas the rear subunit IVb comprises a negative lens component, a positive lens component and a positive lens component. Aberration characteristics of this embodiment are illustrated in FIG. 21 (side position), FIG. 22 (standard position) and FIG. 23 (tele position).

Figure 4:
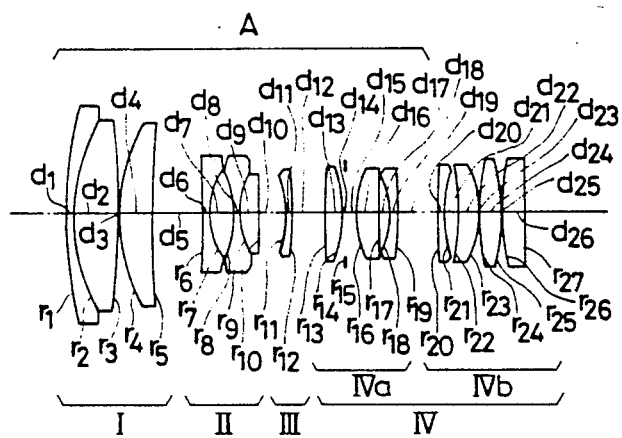
Figure 24:
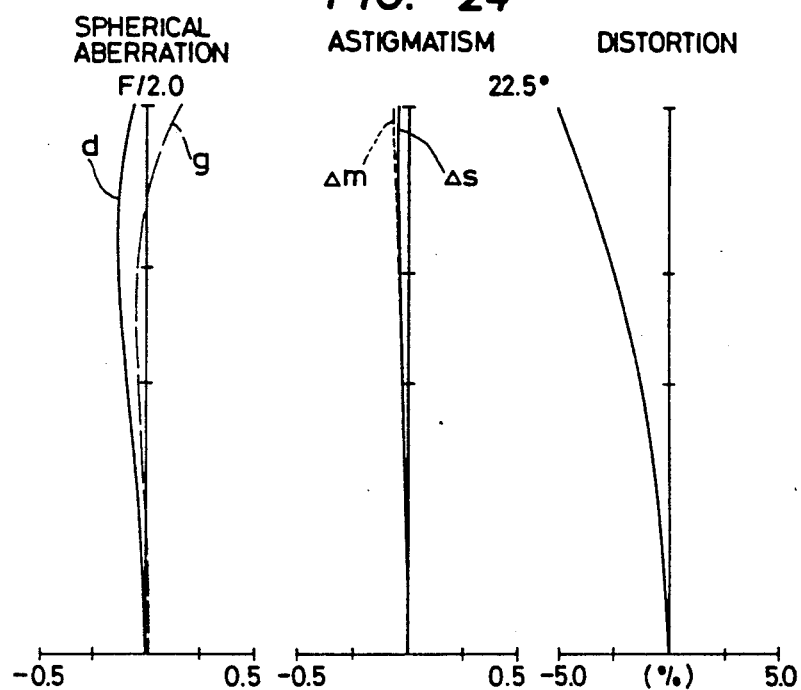
Figure 25:
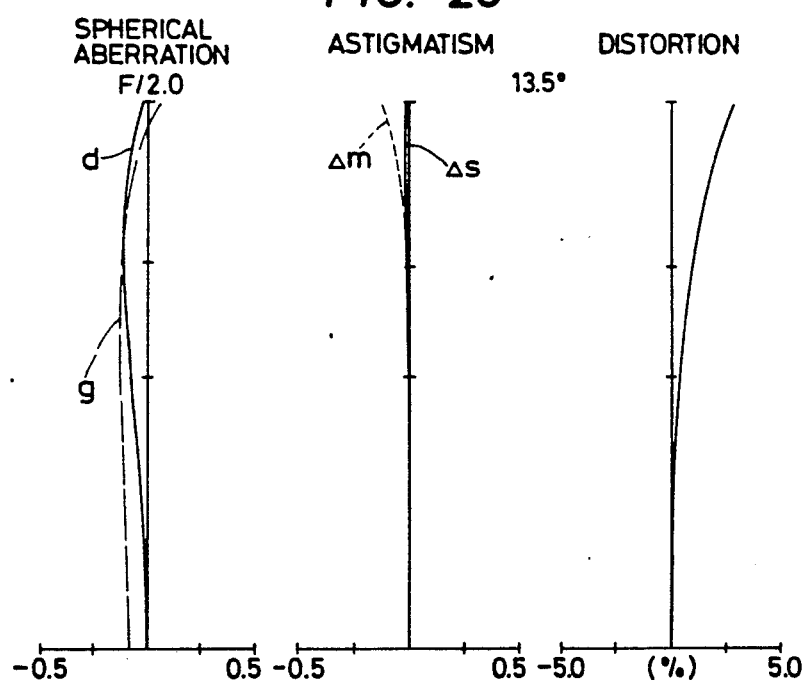

The Embodiment 7 has the composition shown in FIG. 4 wherein the front subunit IVa of the fourth lens unit comprises a positive lens component, a positive lens component having convex surface with strong refractive power on the object side and a negative lens component having a concave surface with strong refractive power on the object side, whereas the rear subunit IVb comprises a negative lens component, a positive lens component, a positive lens component and a positive lens component. Aberration characteristics of this embodiment are illustrated in FIG. 24 (wide position), FIG. 25 (standard position) adn FIG. 26 (tele position).

Figure 5:
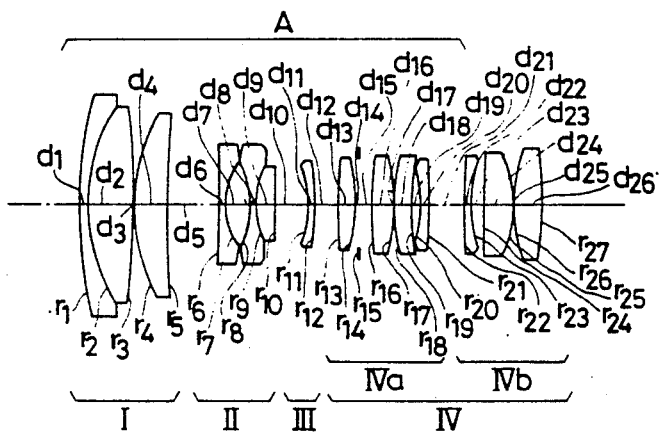
Figure 28:
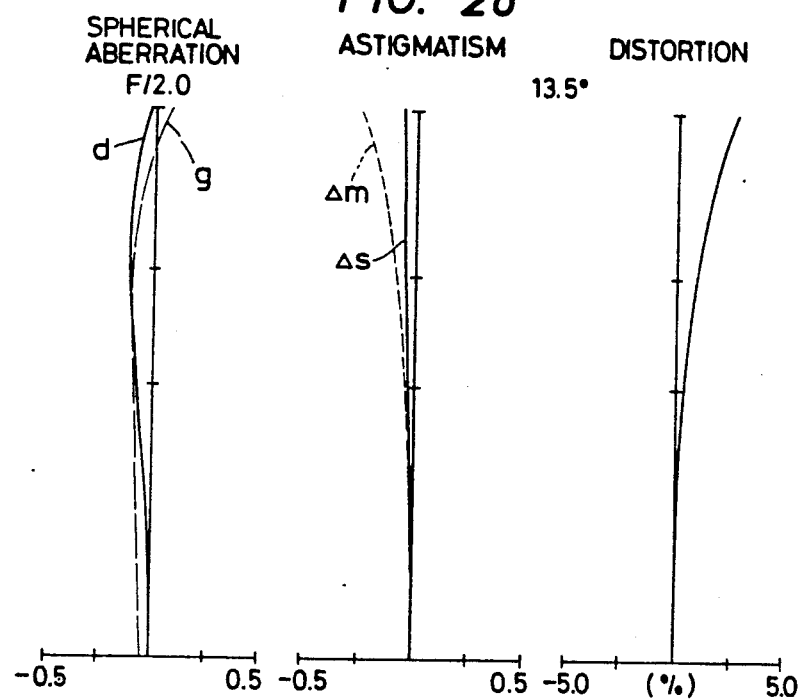
Figure 29:
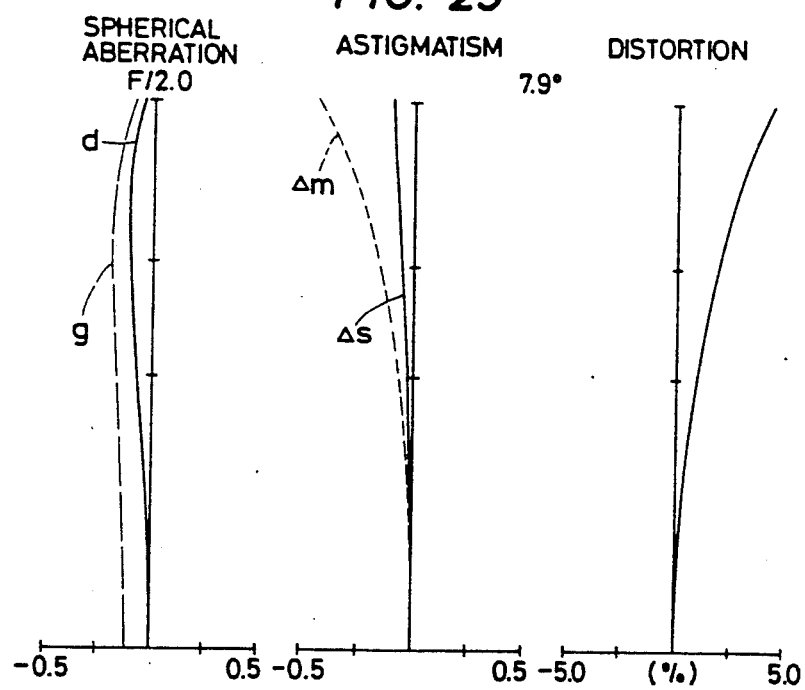
Figure 30:
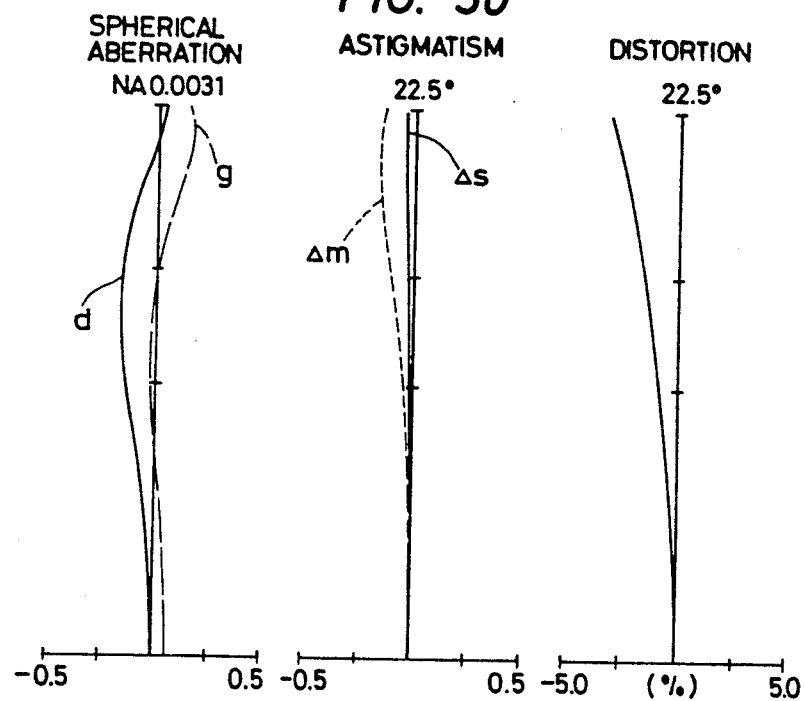
FIG. 30 through FIG. 32 show curves illustrating aberration characteristics of the Embodiment 1 when it is focused on an object located at short distance.
Figure 31:
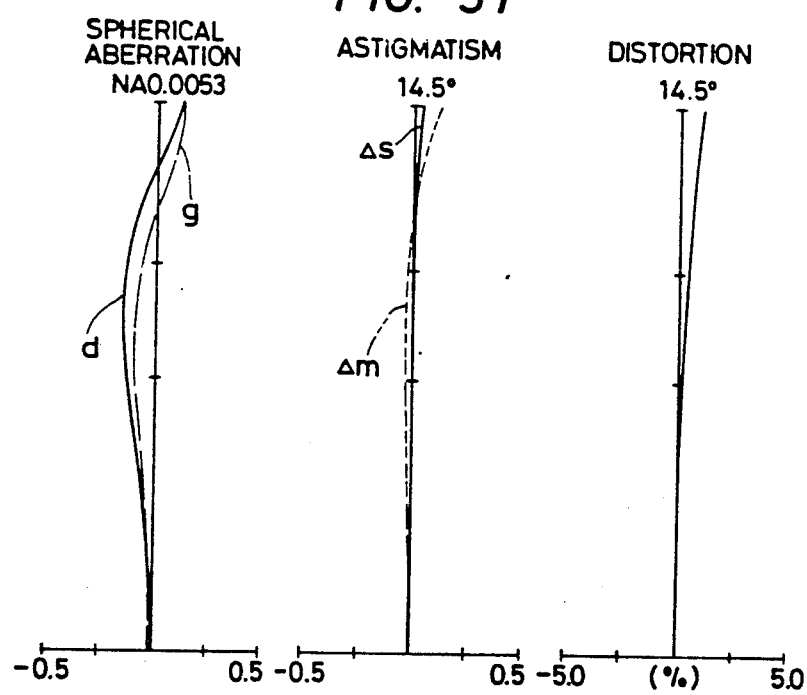
Figure 32:
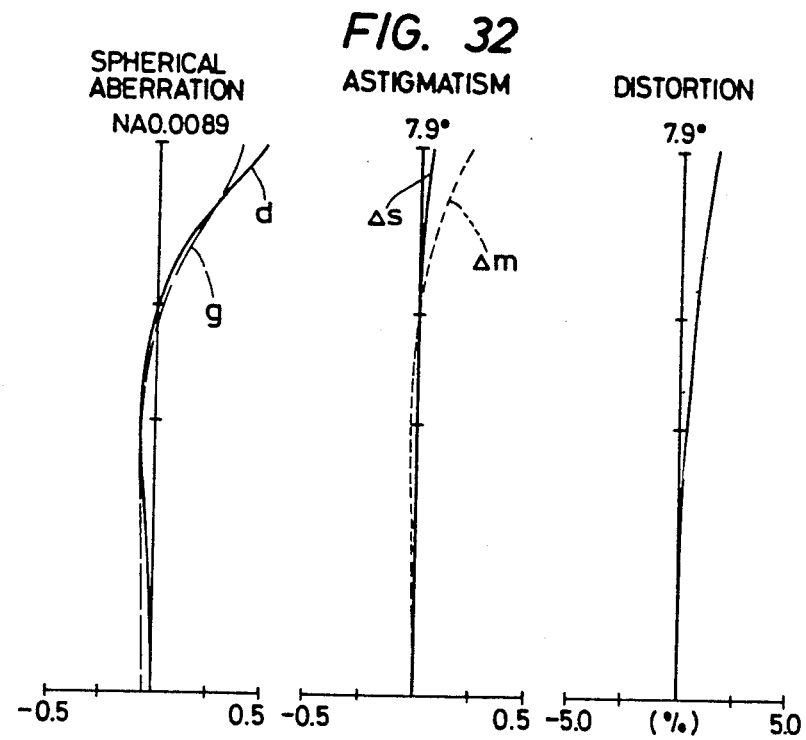
Figure 33:
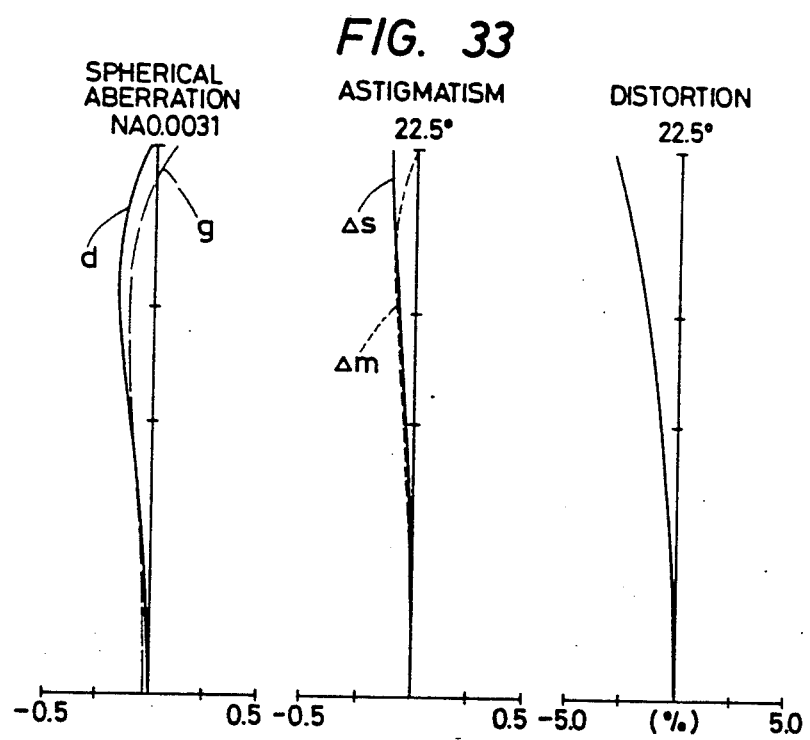
Figure 38:
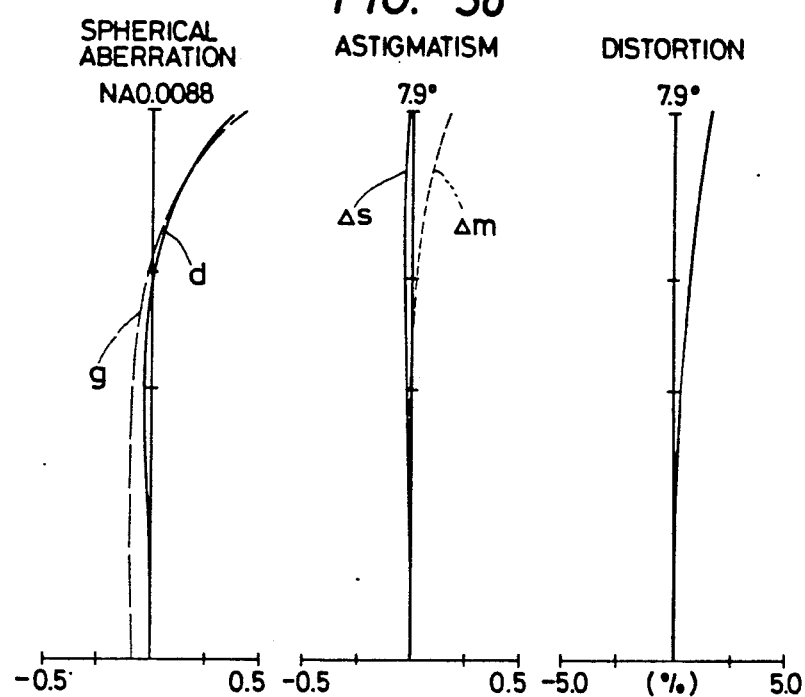
Figure 39:
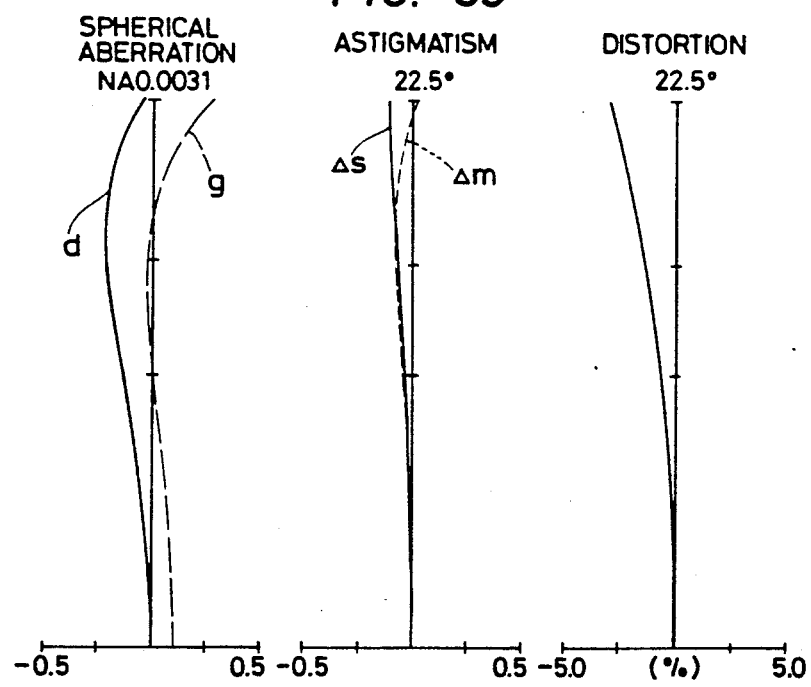
FIG. 39 through FIG. 41 show curves illustrating aberration characteristics of the Embodiment 4 when it is focused on an object located at a short distance.
Figure 40:
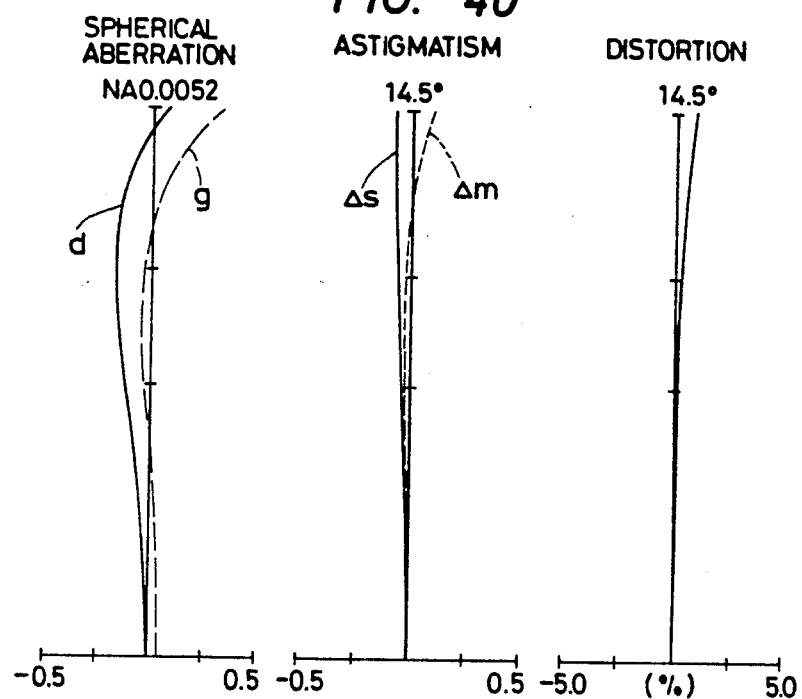
Figure 41:
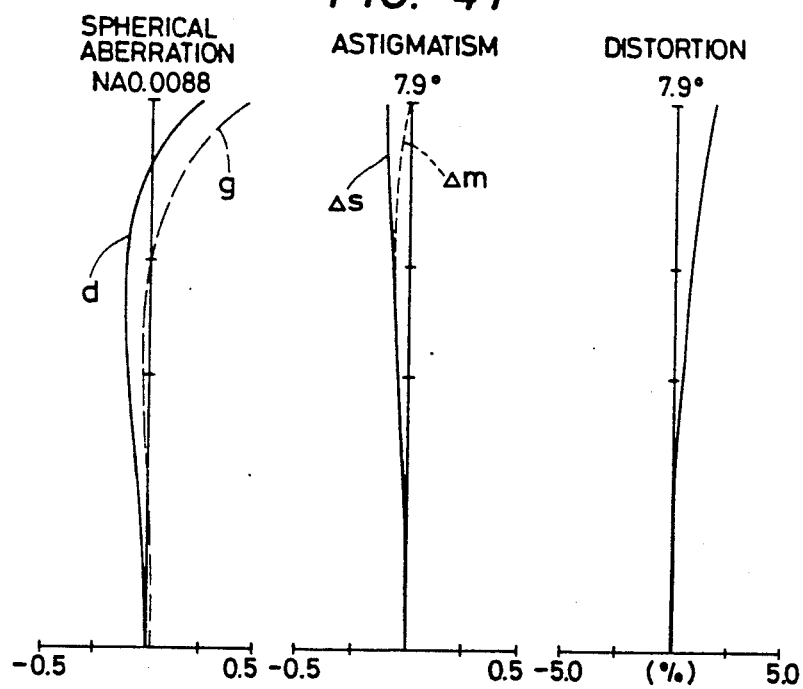
Figure 46:
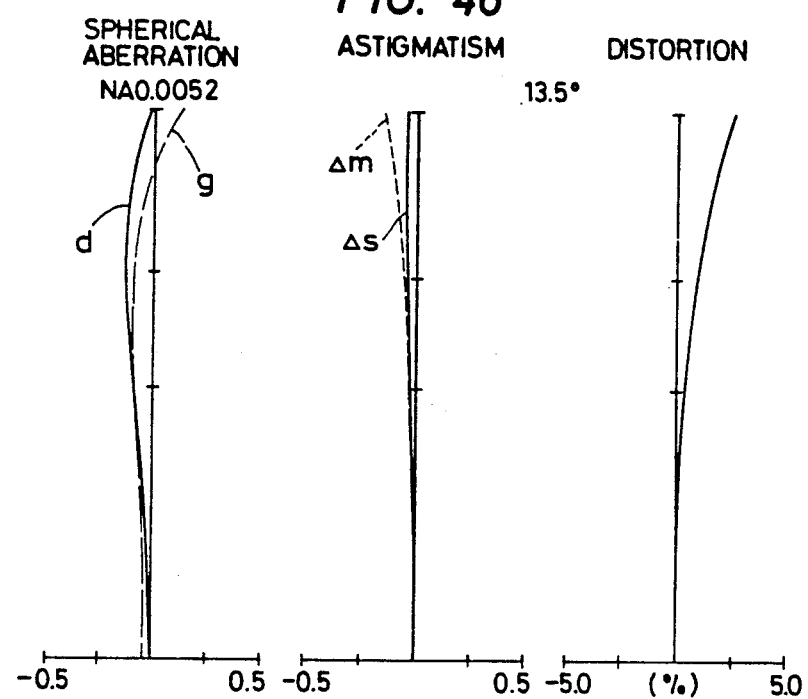
Figure 47:
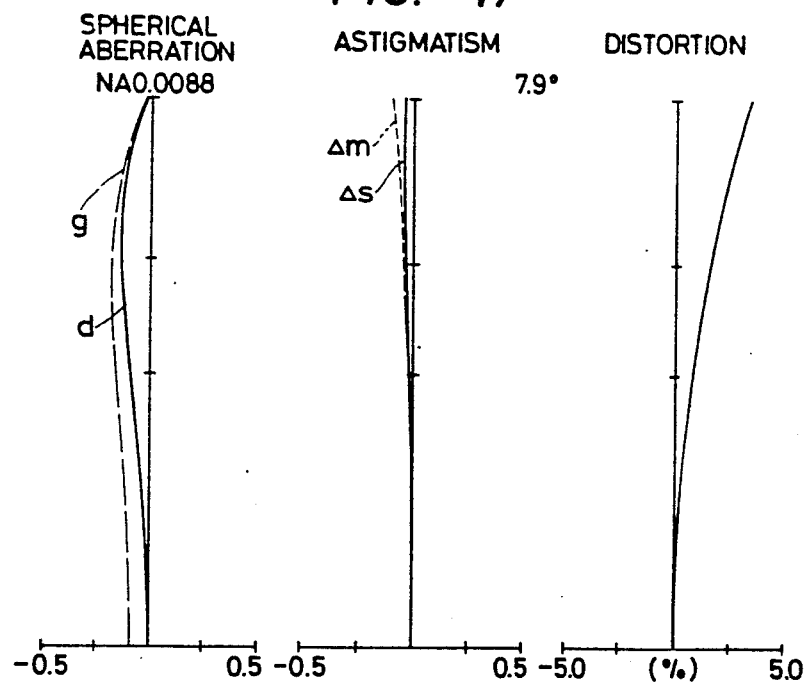
Figure 52:
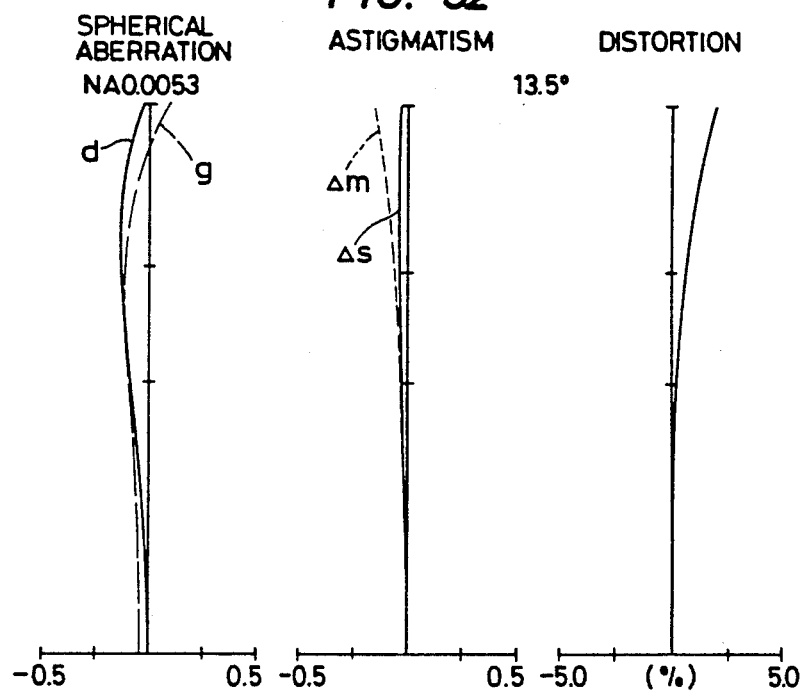
Figure 53:
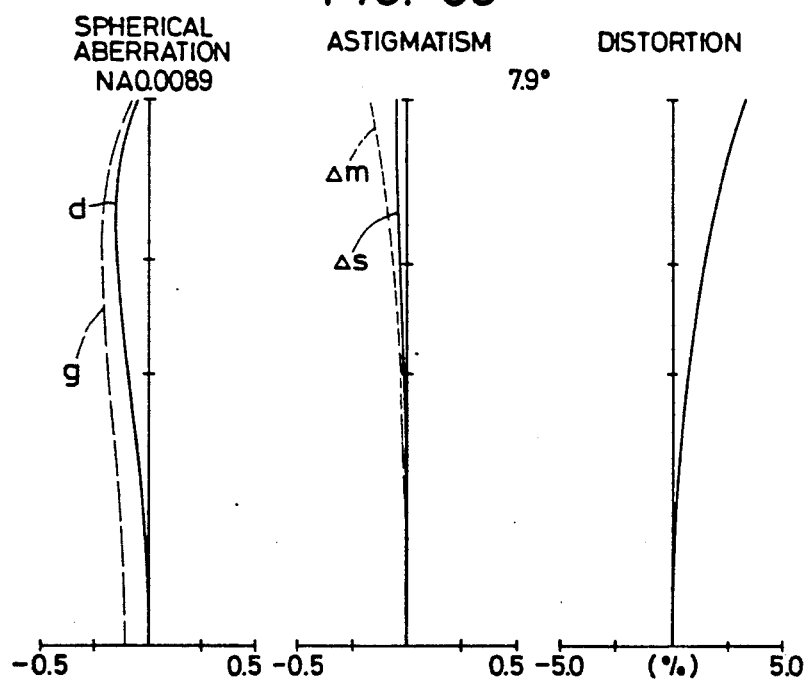

The Embodiment 8 has the composition shown in FIG. 5 wherein the front subunit IVa of the fourth lens unit comprises a positive lens component, a positive lens component, a positive lens component having a convex surface with strong refractive power on the object side and a negative lens component having a concave surface with strong refractive power on the object side, whereas the rear subunit IVb comprises a negative lens component, a positive lens component and a positive lens component. Aberration characteristics of this embodiment are illustrated in FIG. 27 (wide position), FIG. 28 (standard position) and FIG. 29 (tele position).

Each of the above-described embodiments can be focused by shifting the first lens unit frontward. However, these embodiments can adopt also the rear focusing system. That is to say, the embodiments can be focused on objects located even at a very short distance by shifting frontward the rear subunit IVb in the fourth lens unit. For focusing these embodiments on objects located at a very short distance, the rear subunit IVb is shifted for the distances listed below:

TABLE

|  | f = 14 | f = 24.25 | f = 42 |
|---|---|---|---|
| Embodiment 1 | 0.181 | 0.538 | 1.627 |
| Embodiment 2 | 0.183 | 0.542 | 1.633 |
| Embodiment 3 | 0.186 | 0.552 | 1.672 |
| Embodiment 4 | 0.173 | 0.510 | 1.505 |
| Embodiment 5 | 0.173 | 0.510 | 1.499 |
| Embodiment 6 | 0.174 | 0.512 | 1.499 |
| Embodiment 7 | 0.175 | 0.518 | 1.539 |
| Embodiment 8 | 0.176 | 0.516 | 1.510 |

Aberration characteristics at the wide position, standard position and tele position of these embodiments in the conditions where the zoom lens systems are focused on objects located at a very short distance (1.2 m) are illustrated in FIG. 30 through FIG. 32, FIG. 33 through FIG. 35, FIG. 36 through FIG. 38, FIG. 39 through FIG. 41, FIG. 42 through FIG. 44, FIG. 45 through FIG. 47, FIG. 48 through FIG. 50 and FIG. 51 through FIG. 53 respectively.

As is understood from the foregoing detailed descriptions and the numerical data set forth as the preferred embodiments, the present invention has succeeded in providing, by selecting an adequate composition for the fourth lens unit IV used as the relay lens system, a zoom lens system designed for an aperture ratio of F/2.0, a zooming ratio of 3, field angles of 15° to 45° and favorably corrected aberrations regardless of a long back focal distance exceeding 0.9 $f_S$, and having performance high enough to cope with future increase in number of picture elements on imaging device. In addition, the zoom lens system according to the present invention can adopt also the rear focusing system assuring very little variations of aberrations.

I claim:

1. A large-aperture zoom lens system comprising a varifocal subsystem comprising a first lens unit having a positive focal length and being immovable for varying focal length of said zoom lens system as a whole, a second variator lens unit having a negative focal length and being movable for varying focal length of the zoom lens system as a whole, and a third compensator lens unit having a negative focal length and functioning mainly for compensating variation of the image position caused by the variation of the focal length of said zoom lens system as a whole, and a relay lens system arranged as a fourth lens unit, said fourth lens unit consisting of a front subunit comprising a positive lens component, a positive lens component, a biconcave lens component and a positive lens component in the order from object side, and a rear subunit comprising two positive lens components.

2. A large-aperture zoom lens system according to claim 1 wherein said front subunit of said fourth lens unit comprises a positive lens component, a positive lens component, a negative lens component and a positive lens component, whereas said rear subunit comprises a positive lens component and a positive lens component, said zoom lens system having the following numerical data:

| f = 14~24.25~42 | | |
|---|---|---|
| $r_1$ = 84.1276 | | |
| $d_1$ = 1.1600 | $n_1$ = 1.80518 | $\nu_1$ = 25.43 |
| $r_2$ = 29.0902 | | |
| $d_2$ = 7.3000 | $n_2$ = 1.62012 | $\nu_2$ = 49.66 |
| $r_3$ = −273.1915 | | |
| $d_3$ = 0.1700 | | |
| $r_4$ = 28.7778 | | |
| $d_4$ = 5.6000 | $n_3$ = 1.62012 | $\nu_3$ = 49.66 |
| $r_5$ = 203.0683 | | |
| $d_5$ = 0.6000~8.838~14.867 | | |
| $r_6$ = 29.7145 | | |
| $d_6$ = 1.0400 | $n_4$ = 1.73400 | $\nu_4$ = 51.49 |
| $r_7$ = 11.3398 | | |
| $d_7$ = 3.9500 | | |
| $r_8$ = −21.5403 | | |
| $d_8$ = 1.0400 | $n_5$ = 1.69350 | $\nu_5$ = 53.23 |
| $r_9$ = 15.9303 | | |
| $d_9$ = 3.1000 | $n_6$ = 1.84666 | $\nu_6$ = 23.88 |
| $r_{10}$ = 1554.6274 | | |
| $d_{10}$ = 12.9984~5.073~2.828 | | |
| $r_{11}$ = −14.7944 | | |
| $d_{11}$ = 1.0000 | $n_7$ = 1.69680 | $\nu_7$ = 55.52 |
| $r_{12}$ = −36.0319 | | |
| $d_{12}$ = 4.9325~4.598~0.854 | | |
| $r_{13}$ = 50.3787 | | |
| $d_{13}$ = 2.6753 | $n_8$ = 1.74950 | $\nu_8$ = 35.27 |
| $r_{14}$ = −29.8033 | | |
| $d_{14}$ = 0.6469 | | |
| $r_{15}$ = ∞ (stop) | | |
| $d_{15}$ = 2.0000 | | |
| $r_{16}$ = 20.2193 | | |
| $d_{16}$ = 5.3125 | $n_9$ = 1.69350 | $\nu_9$ = 53.23 |

-continued

| $f = 14 \sim 24.25 \sim 42$ | | |
|---|---|---|
| $r_{17} = -440.8891$ | | |
| $d_{17} = 0.8000$ | | |
| $r_{18} = -25.3662$ | | |
| $d_{18} = 1.4008$ | $n_{10} = 1.84666$ | $\nu_{10} = 23.88$ |
| $r_{19} = 18.0976$ | | |
| $d_{19} = 1.8984$ | | |
| $r_{20} = 104.9452$ | | |
| $d_{20} = 3.0000$ | $n_{11} = 1.56873$ | $\nu_{11} = 63.16$ |
| $r_{21} = -33.8872$ | | |
| $d_{21} = 6.0137$ | | |
| $r_{22} = -1877.6563$ | | |
| $d_{22} = 3.6497$ | $n_{12} = 1.48749$ | $\nu_{12} = 70.15$ |
| $r_{23} = -18.1673$ | | |
| $d_{23} = 0.1342$ | | |
| $r_{24} = 27.7264$ | | |
| $d_{24} = 3.3156$ | $n_{13} = 1.48749$ | $\nu_{13} = 70.15$ |
| $r_{25} = -111.3847$ | | |

$1/f_{IV} = 1.642$, $D/f_{IV} = 0.237$, $f_W/f_A = -0.221$
$f_{IVa}/f_S = 1.186$, $f_{IVan}/f_S = -0.507$
$f_I/f_W = 2.996$, $f_{II}/f_W = -1.098$, $n_4 = 1.73400$
$n_6 - n_5 = 0.15316$, $n_5 = 1.69350$
$\nu_5 - \nu_6 = 29.35$, $n_{IVn} = 1.84666$, $f_B = 23.3$
$\nu_{IVap} - \nu_{IVbp} = -19.597$, $t_B/f_S = 0.2928$ wherein the reference symbols $r_1$ through $r_{25}$ represent radii of curvature on the surfaces of the respective lens elements, the rererence symbols $d_1$ through $d_{24}$ designate thicknesses of the respective lens elements and airspaces reserved therebetween, the reference symbols $n_1$ through $n_{13}$ denote refractive indices of the respective lens elements and the reference symbols $\nu_1$ through $\nu_{13}$ represent Abbe's numbers of the respective lens elements.

3. A large-aperture zoom lens system according to claim 1 wherein said front subunit of said fourth lens unit comprises a positive lens component, a positive lens component, a negative lens component and a positive lens component, whereas said rear subunit comprises a positive lens component and a positive lens component, said zoom lens system having the following numerical data:

| $f = 14 \sim 24.25 \sim 42$ | | |
|---|---|---|
| $r_1 = 82.8380$ | | |
| $d_1 = 1.1600$ | $n_1 = 1.80518$ | $\nu_1 = 25.43$ |
| $r_2 = 28.9584$ | | |
| $d_2 = 7.3000$ | $n_2 = 1.62012$ | $\nu_2 = 49.66$ |
| $r_3 = -243.9195$ | | |
| $d_3 = 0.1700$ | | |
| $r_4 = 28.9601$ | | |
| $d_4 = 5.6000$ | $n_3 = 1.62374$ | $\nu_3 = 47.10$ |
| $r_5 = 203.8797$ | | |
| $d_5 = 0.6000 \sim 8.647 \sim 14.529$ | | |
| $r_6 = 29.0358$ | | |
| $d_6 = 1.0400$ | $n_4 = 1.73400$ | $\nu_4 = 51.49$ |
| $r_7 = 11.4509$ | | |
| $d_7 = 3.9500$ | | |
| $r_8 = -21.5434$ | | |
| $d_8 = 1.0400$ | $n_5 = 1.69680$ | $\nu_5 = 55.52$ |
| $r_9 = 16.1419$ | | |
| $d_9 = 3.1000$ | $n_6 = 1.84666$ | $\nu_6 = 23.88$ |
| $r_{10} = 327.0857$ | | |
| $d_{10} = 12.7201 \sim 4.953 \sim 2.849$ | | |
| $r_{11} = -15.1829$ | | |
| $d_{11} = 1.0000$ | $n_7 = 1.69680$ | $\nu_7 = 55.52$ |
| $r_{12} = -38.3036$ | | |
| $d_{12} = 4.8880 \sim 4.594 \sim 0.854$ | | |
| $r_{13} = 50.2085$ | | |
| $d_{13} = 2.6726$ | $n_8 = 1.76200$ | $\nu_8 = 40.10$ |
| $r_{14} = -29.8907$ | | |
| $d_{14} = 0.6433$ | | |
| $r_{15} = \infty$ (stop) | | |
| $d_{15} = 2.0000$ | | |
| $r_{16} = 20.1914$ | | |

-continued

| $f = 14 \sim 24.25 \sim 42$ | | |
|---|---|---|
| $d_{16} = 5.5367$ | $n_9 = 1.69680$ | $\nu_9 = 55.52$ |
| $r_{17} = 2178.6990$ | | |
| $d_{17} = 0.8000$ | | |
| $r_{18} = -25.1867$ | | |
| $d_{18} = 1.4025$ | $n_{10} = 1.84666$ | $\nu_{10} = 23.88$ |
| $r_{19} = 18.2541$ | | |
| $d_{19} = 1.8967$ | | |
| $r_{20} = 89.3959$ | | |
| $d_{20} = 3.0000$ | $n_{11} = 1.62041$ | $\nu_{11} = 60.27$ |
| $r_{21} = -41.7577$ | | |
| $d_{21} = 6.1391$ | | |
| $r_{22} = -2160.7673$ | | |
| $d_{22} = 3.6490$ | $n_{12} = 1.56873$ | $\nu_{12} = 63.16$ |
| $r_{23} = -20.1024$ | | |
| $d_{23} = 0.1342$ | | |
| $r_{24} = 28.7875$ | | |
| $d_{24} = 3.3002$ | $n_{13} = 1.48749$ | $\nu_{13} = 70.15$ |
| $r_{25} = -98.5889$ | | |

$1/f_{IV} = 1.752$, $D/f_{IV} = 0.258$, $f_W/f_A = -0.253$
$f_{IVa}/f_S = 1.180$, $f_{IVan}/f_S = -0.508$
$f_I/f_W = 2.951$, $f_{II}/f_W = -1.068$, $n_4 = 1.73400$
$n_6 - n_5 = 0.14986$, $n_5 = 1.69680$
$\nu_5 - \nu_6 = 31.64$, $n_{IVn} = 1.84666$, $f_B = 23.3$
$\nu_{IVap} - \nu_{IVbp} = -14.692$, $t_B/f_S = 0.2921$ wherein the reference symbols $r_1$ through $r_{25}$ represent radii of curvature on the surfaces of the respective lens elements, the reference symbols $d_1$ through $d_{24}$ designate thicknesses of the respective lens elements and airspaces reserved therebetween the reference symbols $n_1$ through $n_{13}$ denote refractive indices of the respective lens elements and the reference symbols $\nu_1$ through $\nu_{13}$ represent Abbe's nubmers of the respective lens elements.

4. A large-aperture zoom lens system according to claim 1 wherein said front subunit of said fourth lens unit comprises a positive lens component, a positive lens component, a negative lens component and a positive lens component, whereas said rear subunit comprises a positive lens component and a positive lens component, said zoom lens system having the following numerical data:

| $f = 14 \sim 24.25 \sim 42$ | | |
|---|---|---|
| $r_1 = 83.0383$ | | |
| $d_1 = 1.1600$ | $n_1 = 1.80518$ | $\nu_1 = 25.43$ |
| $r_2 = 29.1400$ | | |
| $d_2 = 7.3000$ | $n_2 = 1.62012$ | $\nu_2 = 49.66$ |
| $r_3 = -253.1450$ | | |
| $d_3 = 0.1700$ | | |
| $r_4 = 28.6874$ | | |
| $d_4 = 5.6000$ | $n_3 = 1.62012$ | $\nu_3 = 49.66$ |
| $r_5 = 210.2929$ | | |
| $d_5 = 0.6000 \sim 8.638 \sim 14.534$ | | |
| $r_6 = 30.3630$ | | |
| $d_6 = 1.0400$ | $n_4 = 1.73400$ | $\nu_4 = 51.49$ |
| $r_7 = 11.3638$ | | |
| $d_7 = 3.9500$ | | |
| $r_8 = -21.4761$ | | |
| $d_8 = 1.0400$ | $n_5 = 1.69350$ | $\nu_5 = 53.23$ |
| $r_9 = 17.0207$ | | |
| $d_9 = 3.1000$ | $n_6 = 1.84666$ | $\nu_6 = 23.88$ |
| $r_{10} = 1069.1825$ | | |
| $d_{10} = 13.0418 \sim 5.272 \sim 2.789$ | | |
| $r_{11} = -14.1675$ | | |
| $d_{11} = 1.0000$ | $n_7 = 1.69670$ | $\nu_7 = 55.52$ |
| $r_{12} = -36.2700$ | | |
| $d_{12} = 4.5289 \sim 4.243 \sim 0.854$ | | |
| $r_{13} = 55.6389$ | | |
| $d_{13} = 2.6729$ | $n_8 = 1.74950$ | $\nu_8 = 35.27$ |
| $r_{14} = -31.9536$ | | |
| $d_{14} = 0.6353$ | | |
| $r_{15} = \infty$ (stop) | | |
| $d_{15} = 2.0000$ | | |

-continued

| f = 14~24.25~42 | | |
|---|---|---|
| $r_{16} = 21.0858$ | | |
| $d_{16} = 5.0173$ | $n_9 = 1.69350$ | $v_9 = 53.23$ |
| $r_{17} = -708.9650$ | | |
| $d_{17} = 0.8000$ | | |
| $r_{18} = -27.0343$ | | |
| $d_{18} = 1.4021$ | $n_{10} = 1.84666$ | $v_{10} = 23.88$ |
| $r_{19} = 19.1950$ | | |
| $d_{19} = 1.9053$ | | |
| $r_{20} = 45.3739$ | | |
| $d_{20} = 3.0000$ | $n_{11} = 1.65873$ | $v_{11} = 63.16$ |
| $r_{21} = -24.8871$ | | |
| $d_{21} = 6.6760$ | | |
| $r_{22} = -119.5541$ | | |
| $d_{22} = 3.6491$ | $n_{12} = 1.48749$ | $v_{12} = 70.15$ |
| $r_{13} = -20.3750$ | | |
| $d_{13} = 0.1342$ | | |
| $r_{24} = 28.5509$ | | |
| $d_{24} = 3.3004$ | $n_{13} = 1.48749$ | $v_{13} = 70.15$ |
| $r_{25} = -144.4908$ | | |
| $1/f_{IV} = 1.863$, $D/f_{IV} = 0.296$, $f_W/f_A = -0.016$ | | |
| $f_{IVa}/f_S = 1.071$, $f_{IVan}/f_S = -0.539$ | | |
| $f_I/f_W = 2.939$, $f_{II}/f_W = -1.071$, $n_4 = 1.73400$ | | |
| $n_6 - n_5 = 0.15316$, $n_5 = 1.69350$ | | |
| $v_5 - v_6 = 29.35$, $f_{IVn} = 1.84666$, $f_B = 23.3$ | | |
| $v_{IVap} - v_{IVbp} = -19.597$, $t_B/f_S = 0.2921$ | | | wherein the reference symbols $r_1$ through $r_{25}$ represent radii of curvature on the surfaces of the respective lens elements, the reference symbols $d_1$ through $d_{24}$ designate thicknesses of the respective lens elements and airspaces reserved therebetween the reference symbols $n_1$ through $n_{13}$ denote refractive indices of the respective lens elements and the reference symbols $v_1$ through $v_{13}$ represent Abbe's nubmers of the respective lens elements.

5. A large-aperture zoom lens system according to claim 1 wherein said front subunit of said fourth lens unit comprises a positive lens component, a positive lens component, a negative lens component and a positive lens component, whereas said rear subunit comprises a positive lens component and a positive lens component, said zoom lens system having the following numerical data:

| f = 14~24.25~42 | | |
|---|---|---|
| $r_1 = 82.6129$ | | |
| $d_1 = 1.1600$ | $n_1 = 1.80518$ | $v_1 = 25.43$ |
| $r_2 = 29.2181$ | | |
| $d_2 = 7.3000$ | $n_2 = 1.62012$ | $v_2 = 49.66$ |
| $r_3 = -246.0953$ | | |
| $d_3 = 0.1700$ | | |
| $r_4 = 28.4664$ | | |
| $d_4 = 5.6000$ | $n_3 = 1.62012$ | $v_3 = 49.66$ |
| $r_5 = 217.2658$ | | |
| $d_5 = 0.6000~8.516~14.296$ | | |
| $r_6 = 34.0022$ | | |
| $d_6 = 1.0400$ | $n_4 = 1.73400$ | $v_4 = 51.49$ |
| $r_7 = 11.4972$ | | |
| $d_7 = 3.9500$ | | |
| $r_8 = -20.9945$ | | |
| $d_8 = 1.0400$ | $n_5 = 1.69350$ | $v_5 = 53.23$ |
| $r_9 = 16.3829$ | | |
| $d_9 = 3.1000$ | $n_6 = 1.84666$ | $v_6 = 23.88$ |
| $r_{10} = 646.6454$ | | |
| $d_{10} = 12.8886~5.006~2.865$ | | |
| $r_{11} = -14.2623$ | | |
| $d_{11} = 1.0000$ | $n_7 = 1.69680$ | $v_7 = 55.52$ |
| $r_{12} = -30.9806$ | | |
| $d_{12} = 4.5293~4.484~0.854$ | | |
| $r_{13} = 50.7675$ | | |
| $d_{13} = 2.6656$ | $n_8 = 1.74950$ | $v_8 = 35.27$ |
| $r_{14} = -30.6539$ | | |
| $d_{14} = 0.5921$ | | |
| $r_{15} = \infty$ (stop) | | |

-continued

| f = 14~24.25~42 | | |
|---|---|---|
| $d_{15} = 2.0000$ | | |
| $r_{16} = 19.1840$ | | |
| $d_{16} = 4.5518$ | $n_9 = 1.69350$ | $v_9 = 53.23$ |
| $r_{17} = 3649.8366$ | | |
| $d_{17} = 0.8000$ | | |
| $r_{18} = -24.4207$ | | |
| $d_{18} = 1.4073$ | $n_{10} = 1.84666$ | $v_{10} = 23.88$ |
| $r_{19} = 18.4904$ | | |
| $d_{19} = 3.8044$ | | |
| $r_{20} = 80.9804$ | | |
| $d_{20} = 3.0000$ | $n_{11} = 1.56873$ | $v_{11} = 63.16$ |
| $r_{21} = -23.6744$ | | |
| $d_{21} = 4.3200$ | | |
| $r_{22} = -81.0091$ | | |
| $d_{22} = 3.6442$ | $n_{12} = 1.48749$ | $v_{12} = 70.15$ |
| $r_{23} = -19.6764$ | | |
| $d_{23} = 0.1342$ | | |
| $r_{24} = 28.3524$ | | |
| $d_{24} = 3.3101$ | $n_{13} = 1.48749$ | $v_{13} = 70.15$ |
| $r_{25} = -150.6774$ | | |
| $1/f_{IV} = 1.771$, $D/f_{IV} = 0.184$, $f_W/f_A = 0.010$ | | |
| $f_{IVa}/f_S = 1.095$, $f_{IVan}/f_S = -0.505$ | | |
| $f_I/f_W = 2.894$, $f_{II}/f_W = -1.021$, $n_4 = 1.73400$ | | |
| $n_6 - n_5 = 0.15316$, $n_5 = 1.69350$, | | |
| $v_5 - v_6 = 29.35$, $n_{IVn} = 1.84666$, $f_B = 23.3$ | | |
| $v_{IVap} - v_{IVbp} = -19.597$, $t_B/f_S = 0.2923$ | | | wherein the reference symbols $r_1$ through $r_{25}$ represent radii of curvature on the surfaces of the respective lens elements, the reference symbols $d_1$ through $d_{24}$ designate thicknesses of the respective lens elements and airspaces reserved therebetween, the reference symbols $n_1$ through $n_{13}$ denote refractive indices of the respective lens elements and the reference symbols $v_1$ through $v_{13}$ represent Abbe's numbers of the respective lens elements.

6. A large aperture zoom lens system comprising a varifocal subsystem comprising a first lens unit having a positive focal length and being immovable for varying focal length of said zoom lens system as a whole, a second variator lens unit having a negative focal length and being movable for varying focal length of the zoom lens system as a whole, and a third compensator lens unit having a negative focal length and functioning mainly for compensating variation of the image position caused by the variation of the focal length of said zoom lens system as a whole, and a relay lens system arranged as a fourth lens unit, said fourth lens unit consisting of a front subunit comprising a positive lens component, a positive lens component and a negative lens component having an object side surface with a radius of curvature smaller than the radius of curvature on the image side surface, and a rear subunit comprising a negative lens component having an image side surface with a radius of curvature smaller than the radius of curvature on the object side surface and two positive lens components.

7. A large-aperture zoom lens system according to claim 6 wherein said front subunit of said fourth lens unit comprises a positive lens component, a positive lens component and a negative lens component, whereas said rear subunit comprises a negative lens component, a positive lens component and a positive lens component, said zoom lens system having the following numerical data:

| f = 14~24.25~42 | | |
|---|---|---|
| $r_1 = 73.7446$ | | |
| $d_1 = 1.1600$ | $n_1 = 1.80518$ | $v_1 = 25.43$ |
| $r_2 = 29.0371$ | | |

-continued

| f = 14~24.25~42 | | |
|---|---|---|
| $d_2$ = 7.3000 | $n_2$ = 1.62280 | $v_2$ = 57.06 |
| $r_3$ = −142.5789 | | |
| $d_3$ = 0.1700 | | |
| $r_4$ = 29.7376 | | |
| $d_4$ = 5.6000 | $n_3$ = 1.62012 | $v_3$ = 49.66 |
| $r_5$ = 187.5263 | | |
| $d_5$ = 0.6000~8.158~13.563 | | |
| $r_6$ = 761.2471 | | |
| $d_6$ = 1.0400 | $n_4$ = 1.73400 | $v_4$ = 51.49 |
| $r_7$ = 12.6032 | | |
| $d_7$ = 3.9500 | | |
| $r_8$ = −19.9311 | | |
| $d_8$ = 1.0400 | $n_5$ = 1.69350 | $v_5$ = 53.23 |
| $r_9$ = 14.4310 | | |
| $d_9$ = 3.1000 | $n_6$ = 1.84666 | $v_6$ = 23.88 |
| $r_{10}$ = −537.6964 | | |
| $d_{10}$ = 14.1628~4.601~3.099 | | |
| $r_{11}$ = −23.9031 | | |
| $d_{11}$ = 1.0000 | $n_7$ = 1.69680 | $v_7$ = 55.52 |
| $r_{12}$ = −49.2275 | | |
| $d_{12}$ = 2.7690~4.810~0.854 | | |
| $r_{13}$ = 83.5278 | | |
| $d_{13}$ = 2.6697 | $n_8$ = 1.73400 | $v_8$ = 51.49 |
| $r_{14}$ = −26.0628 | | |
| $d_{14}$ = 0.6362 | | |
| $r_{15}$ = ∞ (stop) | | |
| $d_{15}$ = 2.0000 | | |
| $r_{16}$ = 22.6911 | | |
| $d_{16}$ = 3.1050 | $n_9$ = 1.69680 | $v_9$ = 55.52 |
| $r_{17}$ = 205.0173 | | |
| $d_{17}$ = 1.2990 | | |
| $r_{18}$ = −23.8698 | | |
| $d_{18}$ = 1.0000 | $n_{10}$ = 1.85666 | $v_{10}$ = 23.88 |
| $r_{19}$ = −199.2548 | | |
| $d_{19}$ = 8.6005 | | |
| $r_{20}$ = 152.2247 | | |
| $d_{20}$ = 1.0000 | $n_{11}$ = 1.80518 | $v_{11}$ = 25.43 |
| $r_{21}$ = 26.2448 | | |
| $d_{21}$ = 1.9319 | | |
| $r_{22}$ = 120.3715 | | |
| $d_{22}$ = 4.7975 | $n_{12}$ = 1.56873 | $v_{12}$ = 63.16 |
| $r_{23}$ = −19.9767 | | |
| $d_{23}$ = 0.1342 | | |
| $r_{24}$ = 23.9392 | | |
| $d_{24}$ = 4.6311 | $n_{13}$ = 1.48749 | $v_{13}$ = 70.15 |
| $r_{25}$ = −72.0532 | | |

$1/f_{IV}$ = 1.826, $D/f_{IV}$ = 0.346, $f_W/f_A$ = 0.057
$f_I/f_W$ = 2.717, $f_{II}/f_W$ = −0.851, $n_4$ = 1.73400
$n_6 - n_5$ = 0.15316, $n_5$ = 1.69350
$v_5 - v_6$ = 29.35, $n_{IV_n}$ = 1.82592,
$v_{IVap} - v_{IVbp}$ = −13.15, $f_B$ = 0.95$f_S$ wherein the reference symbols $r_1$ through $r_{25}$ represent radii of curvature on the surfaces of the respective lens elements, the reference symbols $d_1$ through $d_{24}$ designate thicknesses of the respective lens elements and airspaces reserved therebetween, the reference symbols $n_1$ through $n_{13}$ denote refractive indices of the respective lens elements and the reference symbols $v_1$ through $v_{13}$ represent Abbe's numbers of the respective lens elements.

8. A large-aperture zoom lens system according to claim 6 wherein said front subunit of said fourth lens unit comprises a positive lens component, a positive lens component and a negative lens component, whereas said rear subunit comprises a negative lens component, a positive lens component, a positive lens component and a positive lens component, said zoom lens system having the following numerical data:

| f = 14~24.25~42 | | |
|---|---|---|
| $r_1$ = 73.4599 | | |
| $d_1$ = 1.1600 | $n_1$ = 1.80518 | $v_1$ = 25.43 |
| $r_2$ = 29.7582 | | |

-continued

| f = 14~24.25~42 | | |
|---|---|---|
| $d_2$ = 7.3000 | $n_2$ = 1.62280 | $v_2$ = 57.06 |
| $r_3$ = −143.3946 | | |
| $d_3$ = 0.1700 | | |
| $r_4$ = 29.8304 | | |
| $d_4$ = 5.6000 | $n_3$ = 1.62012 | $v_3$ = 49.66 |
| $r_5$ = 193.5783 | | |
| $d_5$ = 0.6000~8.068~13.415 | | |
| $r_6$ = −249.6054 | | |
| $d_6$ = 1.0400 | $n_4$ = 1.73400 | $v_4$ = 51.49 |
| $r_7$ = 13.4290 | | |
| $d_7$ = 3.9500 | | |
| $r_8$ = −22.3190 | | |
| $d_8$ = 1.0400 | $n_5$ = 1.69350 | $v_5$ = 53.23 |
| $r_9$ = 13.6545 | | |
| $d_9$ = 3.1000 | $n_6$ = 1.84666 | $v_6$ = 23.88 |
| $r_{10}$ = 395.1326 | | |
| $d_{10}$ = 13.8889~4.363~3.225 | | |
| $r_{11}$ = −29.6120 | | |
| $d_{11}$ = 1.0000 | $n_7$ = 1.69680 | $v_7$ = 55.52 |
| $r_{12}$ = −74.5434 | | |
| $d_{12}$ = 3.0371~5.106~0.854 | | |
| $r_{13}$ = 103.8661 | | |
| $d_{13}$ = 2.6656 | $n_8$ = 1.72916 | $v_8$ = 54.68 |
| $r_{14}$ = −26.8147 | | |
| $d_{14}$ = 0.5983 | | |
| $r_{15}$ = ∞ (stop) | | |
| $d_{15}$ = 2.0000 | | |
| $r_{16}$ = 24.1544 | | |
| $d_{16}$ = 3.7803 | $n_9$ = 1.69680 | $v_9$ = 55.52 |
| $r_{17}$ = 586.5944 | | |
| $d_{17}$ = 1.2984 | | |
| $r_{18}$ = −21.4118 | | |
| $d_{18}$ = 1.0000 | $n_{10}$ = 1.84666 | $v_{10}$ = 23.88 |
| $r_{19}$ = −175.5530 | | |
| $d_{19}$ = 6.6556 | | |
| $r_{20}$ = 78.7259 | | |
| $d_{20}$ = 1.0000 | $n_{11}$ = 1.80518 | $v_{11}$ = 25.43 |
| $r_{21}$ = 33.7443 | | |
| $d_{21}$ = 1.9815 | | |
| $r_{22}$ = −76.7912 | | |
| $d_{22}$ = 3.8000 | $n_{12}$ = 1.48749 | $v_{12}$ = 70.15 |
| $r_{23}$ = −17.6494 | | |
| $d_{23}$ = 0.1342 | | |
| $r_{24}$ = 51.5682 | | |
| $d_{24}$ = 3.0000 | $n_{13}$ = 1.48749 | $v_{13}$ = 70.15 |
| $r_{25}$ = −54.5234 | | |
| $d_{25}$ = 0.1500 | | |
| $r_{26}$ = 33.6811 | | |
| $d_{26}$ = 3.7439 | $n_{14}$ = 1.48749 | $v_{14}$ = 70.15 |
| $r_{27}$ = 306.4734 | | |

$1/f_{IV}$ = 1.907, $D/f_{IV}$ = 0.284, $f_W/f_A$ = −0.078
$f_I/f_W$ = 2.696, $f_{II}/f_W$ = −0.844, $n_4$ = 1.73400
$n_6 - n_5$ = 0.15316, $n_5$ = 1.69350
$v_5 - v_6$ = 29.35, $n_{IV_n}$ = 1.82592
$v_{IVap} - v_{IVbp}$ = −15.05, $f_B$ = 0.95$f_S$ wherein the reference symbols $r_1$ through $r_{27}$ represent radii of curvature on the surfaces of the respective lens elements, the reference symbols $d_1$ through $d_{26}$ designate thicknesses of the respective lens elements and airspaces reversed therebetween, the reference symbols $n_1$ through $n_{14}$ denote refractive indices of the respective lens elements and the reference symbols $v_1$ through $v_{14}$ represent Abbe's numbers of the rspective lens elements.

9. A large-aperture zoom lens system according to claim 1 wherein distance l as measured from the rear focal point of said zoom lens system as a whole to the rear principal point of the negative lens component arrange in the most image side of the front subunit of said fourth lens unit satisfies the following condition (1):

$$1.5f_{IV} < l < 2.2f_{IV} \qquad (1)$$

wherein the reference symbol $f_{IV}$ represents focal length of said fourth lens unit.

10. A large-aperture zoom lens system according to claim 9 wherein airspace D reserved between the front and rear subunits in said fourth lens unit satisfies the following condition (2):

$$0.14 f_{IV} < D < 0.5 f_{IV} \qquad (2).$$

11. A large-aperture zoom lens system according to claim 10 wherein the system ranging from said first lens unit to the front subunit of said fourth lens unit forms a nearly afocal system, said zoom lens system being so designed as to satisfy the following condition (3):

$$-0.3 < f_W/f_A < 0.3 \qquad (3)$$

wherein the reference symbol $f_W$ represents the shortest focal length of said zoom lens system as a whole and the reference symbol $f_A$ designates total focal length of the system ranging from said first lens unit to said fourth lens unit.

12. A large-aperture zoom lens system according to claim 11 satisfying the following conditions (4) and (5):

$$2.5 f_W < f_I < 3.5 f_W \qquad (4)$$

$$-1.2 f_W < f_{II} < -0.8 f_W \qquad (5)$$

wherein the reference symbol $f_I$ represents focal length of said first lens unit and the reference symbol $f_{II}$ designates focal length of said second lens unit.

13. A large-aperture zoom lens system according to claim 11 so adapted as to be focused on an object located at a very short distance by shifting the rear subunit of said fourth lens unit.

14. A large-aperture zoom lens system according to claim 13 satisfying the following conditions (12) through (14):

$$0.5 f_S < f_{IVa} < 1.6 f_S \qquad (12)$$

$$0.42 f_S < |f_{IVan}| < 0.64 f_S \qquad (13)$$

$$t_B < 0.45 f_S \qquad (14)$$

wherein the reference symbol $f_{IVa}$ represents focal length of the front subunit of said fourth lens group, the reference symbol $f_{IVan}$ designates focal length of the negative lens component arranged in said front subunit, the reference symbol $f_S$ denotes a geometrical mean of the shortest focal length and the longest focal length of said zoom lens system as a whole, and the reference symbol $t_B$ represents distance as measured from the extreme object side surface to the extreme image side surface of the rear subunit of said fourth lens unit.

15. A large-aperture zoom lens system according to claim 12 wherein said first lens unit comprises a positive cemented doublet comprising a negative meniscus lens element and a biconvex lens element, and a positive meniscus lens component, said second lens unit comprises a negative meniscus lens component, and a negative cemented doublet comprising a biconcave lens element and a positive lens element, and said third lens unit comprises a negative lens component, said zoom lens system being so designed as to satisfy the following conditions (6) through (9):

$$1.7 < n_4 \qquad (6)$$

$$0.05 < n_6 - n_5 \qquad (7)$$

$$1.6 < n_5 \qquad (8)$$

$$13 < \nu_5 - \nu_6 \qquad (9)$$

wherein the reference symbol $n_4$ represents refractive index of the negative meniscus lens component arranged in said second lens unit, the reference symbols $n_5$ and $n_6$ designate refractive indices of the biconcave lens element and positive lens element respectively of the cemented doublet arranged in said second lens unit, and the reference symbols $\nu_5$ and $\nu_6$ denote Abbe's numbers of the biconcave lens element and positive lens element of the cemented doublet arranged in said second lens unit.

16. A large-aperture zoom lens system according to claim 15 satisfying the following conditions (10) and (11):

$$1.78 < n_{IVn} \qquad (10)$$

$$\nu_{IVap} < \nu_{IVbp} \qquad (11)$$

wherein the reference symbol $n_{IVn}$ represents a mean refractive index of the negative lens components arranged in said fourth lens unit, the reference symbol $\nu_{IVap}$ designates a mean Abbe's number of the positive lens components arranged in the front subunit of said fourth lens unit and the reference symbol $\nu_{IVbp}$ denotes a mean Abbe's number of the positive lens components arranged in the rear subgroup of said fourth lens unit.

17. A large-aperture zoom lens system according to claim 16 so adapted as to be focused on an object located at a very short distance by shifting the rear subunit of said fourth lens unit.

18. A larger aperture zoom lens system comprising a varifocal subsystem comprising a first lens unit having a positive focal length and being immovable for varying focal length of said zoom lens system as a whole, a second variator lens unit having a negative focal length and being movable for varying focal length of the zoom lens system as a whole, and a third compensator lens unit having a negative focal length and functioning mainly for compensating variation of the image position caused by the variation of the focal length of said zoom lens system as a whole, and a relay lens system arranged as a fourth lens unit, said first lens unit comprising a positive cemented doublet comprising a negative meniscus lens element and a biconvex lens element, and a positive meniscus lens component, said second lens unit comprising a negative meniscus lens component, and a negative cemented doublet comprising a biconcave lens element and a positive lens element, said third lens unit comprises a negative lens component and said fourth lens unit consisting of a front sub-unit comprising a positive lens component, a positive lens component, a positive lens component and a negative lens component, and a rear sub-unit comprising a positive lens component and a positive lens component, said zoom lens system having the following numerical data:

| $f = 14 \sim 24.25 \sim 42$ | | | |
|---|---|---|---|
| $r_1 = 145.4589$ | | | |
| $d_1 = 1.1600$ | | $n_1 = 1.80518$ | $\nu_1 = 25.43$ |
| $r_2 = 28.8038$ | | | |
| $d_2 = 7.3000$ | | $n_2 = 1.62012$ | $\nu_2 = 49.66$ |

-continued $f = 14 \sim 24.25 \sim 42$

| | | |
|---|---|---|
| $r_3 = -124.4191$ | | |
| $d_3 = 0.1700$ | | |
| $r_4 = 28.0380$ | | |
| $d_4 = 5.6000$ | $n_4 = 1.62045$ | $\nu_3 = 38.12$ |
| $r_5 = 194.2344$ | | |
| $d_5 = 0.6000 \sim 9.404 \sim 16.075$ | | |
| $r_6 = 27.2667$ | | |
| $d_6 = 1.0400$ | $n_4 = 1.78590$ | $\nu_4 = 44.18$ |
| $r_7 = 10.3892$ | | |
| $d_7 = 3.9500$ | | |
| $r_8 = -15.8056$ | | |
| $d_8 = 1.0400$ | $n_5 = 1.70154$ | $\nu_5 = 41.21$ |
| $r_9 = 13.5487$ | | |
| $d_9 = 3.4000$ | $n_6 = 1.84666$ | $\nu_6 = 23.88$ |
| $r_{10} = -92.7796$ | | |
| $d_{10} = 17.4871 \sim 8.204 \sim 2.434$ | | |
| $r_{11} = -11.9646$ | | |
| $d_{11} = 1.0000$ | $n_7 = 1.71300$ | $\nu_7 = 53.84$ |
| $r_{12} = -42.5665$ | | |
| $d_{12} = 1.2558 \sim 1.725 \sim 0.855$ | | |
| $r_{13} = -85.6664$ | | |
| $d_{13} = 2.7002$ | $n_8 = 1.59270$ | $\nu_8 = 35.29$ |
| $r_{14} = -17.9449$ | | |
| $d_{14} = 0.8553$ | | |
| $r_{15} = \infty$ (stop) | | |
| $d_{15} = 2.0000$ | | |
| $r_{16} = 21.1736$ | | |
| $d_{16} = 4.5115$ | $n_9 = 1.62230$ | $\nu_9 = 53.20$ |
| $r_{17} = -27.2639$ | | |
| $d_{17} = 0.2100$ | | |
| $r_{18} = 14.3135$ | | |
| $d_{18} = 3.1600$ | $n_{10} = 1.51742$ | $\nu_{10} = 52.41$ |
| $r_{19} = 115.7820$ | | |
| $d_{19} = 1.2000$ | | |
| $r_{20} = -25.5498$ | | |
| $d_{20} = 1.6617$ | $n_{11} = 1.84666$ | $\nu_{11} = 23.88$ |
| $r_{21} = 15.2150$ | | |
| $d_{21} = 8.5579$ | | |
| $r_{22} = 2332.0237$ | | |
| $d_{22} = 4.2478$ | $n_{12} = 1.51112$ | $\nu_{12} = 60.48$ |
| $r_{23} = -20.8501$ | | |
| $d_{23} = 0.1342$ | | |
| $r_{24} = 33.8590$ | | |
| $d_{24} = 4.6445$ | $n_{13} = 1.48749$ | $\nu_{13} = 70.15$ |
| $r_{25} = -61.6882$ | | |

$1/f_{IV} = 1.852$, $D/f_{IV} = 0.385$, $f_W/f_A = -0.197$
$f_{IVa}/f_S = 0.667$, $f_{IVan}/f_S = -0.456$
$f_I/f_W = 3.061$, $f_{II}/f_W = -0.999$, $n_4 = 1.78590$
$n_6 - n_5 = 0.14512$, $n_5 = 1.70154$,
$\nu_5 - \nu_6 = 17.33$, $n_{IVn} = 1.84666$, $f_B = 23.3$
$\nu_{IVap} - \nu_{IVbp} = -18.348$, $t_B/f_S = 0.3722$ wherein the reference symbols $r_1$ through $r_{25}$ represent radii of curvature on the surfaces of the respective lens elements, the reference symbols $d_1$ through $d_{24}$ designate thicknesses of the respective lens elements and airspaces reserved therebetween, the reference symbols $n_1$ through $n_{13}$ denote refractive indices of the respective lens elements and the reference symbols $\nu_1$ through $\nu_{13}$ represent Abbe's numbers of the respective lens elements.

19. A large aperture zoom lens system comprising a varifocal subsystem comprising a first lens unit having a positive focal length and being immovable for varying focal length of said zoom lens system as a whole, a second variator lens unit having a negative focal length and being movable for varying focal length of the zoom lens system as a whole, and a third compensator lens unit having a negative focal length and functioning mainly for compensating variation of the image position caused by the variation of the focal length of said zoom lens system as a whole, and a relay lens system arranged as a fourth lens unit, said first lens unit comprises a positive cemented doublet comprising a negative meniscus lens element and a biconvex lens element, and a positive meniscus lens component, said second lens unit comprising a negative meniscus lens component, and a negative cemented doublet comprising a biconcave lens element and a positive lens element, said third lens unit comprising a negative lens component, and said fourth lens unit consisting of a front sub-unit comprising a positive lens component, a positive lens component and a negative lens component, and a rear sub-unit comprising a negative lens component, a positive lens component and a positive lens component, said zoom lens system having the following numerical data:

$f = 14 \sim 24.25 \sim 42$

| | | |
|---|---|---|
| $r_1 = 73.1407$ | | |
| $d_1 = 1.1600$ | $n_1 = 1.80518$ | $\nu_1 = 25.43$ |
| $r_2 = 29.2813$ | | |
| $d_2 = 7.3000$ | $n_2 = 1.62280$ | $\nu_2 = 57.06$ |
| $r_3 = -142.5699$ | | |
| $d_3 = 0.1700$ | | |
| $r_4 = 29.4855$ | | |
| $d_4 = 5.6000$ | $n_3 = 1.62012$ | $\nu_3 = 49.66$ |
| $r_5 = 188.5203$ | | |
| $d_5 = 0.6000 \sim 8.038 \sim 13.370$ | | |
| $r_6 = -2148.9531$ | | |
| $d_6 = 1.0400$ | $n_4 = 1.73400$ | $\nu_4 = 51.49$ |
| $r_7 = 12.7344$ | | |
| $d_7 = 3.9500$ | | |
| $r_8 = -19.2458$ | | |
| $d_8 = 1.0400$ | $n_5 = 1.69350$ | $\nu_5 = 53.23$ |
| $r_9 = 14.4976$ | | |
| $d_9 = 3.1000$ | $n_6 = 1.84666$ | $\nu_6 = 23.88$ |
| $r_{10} = -336.4032$ | | |
| $d_{10} = 14.0324 \sim 5.201 \sim 2.643$ | | |
| $r_{11} = -21.0833$ | | |
| $d_{11} = 1.0000$ | $n_7 = 1.69680$ | $\nu_7 = 55.52$ |
| $r_{12} = -51.2968$ | | |
| $d_{12} = 2.3119 \sim 3.735 \sim 0.854$ | | |
| $r_{13} = 103.8053$ | | |
| $d_{13} = 2.6678$ | $n_8 = 1.72916$ | $\nu_8 = 54.68$ |
| $r_{14} = -34.5149$ | | |
| $d_{14} = 0.6169$ | | |
| $r_{15} = \infty$ (stop) | | |
| $d_{15} = 2.0000$ | | |
| $r_{16} = 52.1018$ | | |
| $d_{16} = 3.3386$ | $n_9 = 1.69680$ | $\nu_9 = 55.52$ |
| $r_{17} = -58.1766$ | | |
| $d_{17} = 0.1500$ | | |
| $r_{18} = 30.8549$ | | |
| $d_{18} = 3.0000$ | $n_{10} = 1.69680$ | $\nu_{10} = 55.52$ |
| $r_{19} = 90.7813$ | | |
| $d_{19} = 1.3000$ | | |
| $r_{20} = -24.0593$ | | |
| $d_{20} = 1.0000$ | $n_{11} = 1.84666$ | $\nu_{11} = 23.88$ |
| $r_{21} = -184.3586$ | | |
| $d_{21} = 5.8297$ | | |
| $r_{22} = 136.6332$ | | |
| $d_{22} = 1.0000$ | $n_{12} = 1.80518$ | $\nu_{12} = 25.43$ |
| $r_{23} = 27.4732$ | | |
| $d_{23} = 1.9396$ | | |
| $r_{24} = 178.2794$ | | |
| $d_{24} = 4.7972$ | $n_{13} = 1.56873$ | $\nu_{13} = 63.16$ |
| $r_{25} = -19.8353$ | | |
| $d_{25} = 0.1342$ | | |
| $r_{26} = 27.9084$ | | |
| $d_{26} = 4.6096$ | $n_{14} = 1.48749$ | $\nu_{14} = 70.15$ |
| $r_{27} = -64.6149$ | | |

$1/f_{IV} = 1.860$, $D/f_{IV} = 0.255$, $f_W/f_A = 0.110$
$f_I/f_W = 2.685$, $f_{II}/f_W = -0.840$, $n_4 = 1.73400$
$n_6 - n_5 = 0.15316$, $n_5 = 1.69350$
$\nu_5 - \nu_6 = 29.35$, $n_{IVn} = 1.82592$
$\nu_{IVap} - \nu_{IVbp} = -11.415$, $f_B = 0.95 f_S$ wherein the reference symbols $r_1$ through $r_{27}$ represent radii of curvature on the surfaces of the respective lens elements, the reference symbols $d_1$ through $d_{26}$ designate thicknesses of the respective lens elements and airspaces reserved therebetween, the reference symbols $n_1$ through $n_{14}$ denote refractive indices of the respective lens elements and the reference symbols $\nu_1$ through $\nu_{14}$ represents Abbe's numbers of the respective lens elements.

* * * * *